United States Patent
Zhang et al.

(10) Patent No.: US 11,710,826 B2
(45) Date of Patent: Jul. 25, 2023

(54) SURFACE-FUNCTIONALIZED SILICON ANODE FOR HIGH ENERGY LITHIUM ION BATTERIES

(71) Applicant: UChicago Argonne, LLC, Chicago, IL (US)

(72) Inventors: Zhengcheng Zhang, Naperville, IL (US); Sisi Jiang, Willowbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 548 days.

(21) Appl. No.: 16/847,952

(22) Filed: Apr. 14, 2020

(65) Prior Publication Data

US 2022/0059842 A1  Feb. 24, 2022

(51) Int. Cl.
| | |
|---|---|
| *H01M 4/60* | (2006.01) |
| *H01M 4/137* | (2010.01) |
| *H01M 10/0525* | (2010.01) |
| *C01B 33/02* | (2006.01) |
| *H01M 10/054* | (2010.01) |
| *H01M 4/02* | (2006.01) |

(52) U.S. Cl.
CPC .............. *H01M 4/604* (2013.01); *C01B 33/02* (2013.01); *H01M 4/137* (2013.01); *H01M 10/054* (2013.01); *H01M 10/0525* (2013.01); *H01M 2004/027* (2013.01)

(58) Field of Classification Search
None
See application file for complete search history.

(56) References Cited

PUBLICATIONS

Aguiar et al., "Structural Study of Sol-Gel Silicate Glasses by IR and Raman Spectroscopies", Apr. 1, 2009, Journal of Non-Crystalline Solids, vol. 335, Issue 8, pp. 475-480.
Armand et al., "Building Better Batteries", Feb. 7, 2008, Nature, vol. 451, pp. 652-657.
Benoit et al., "Measuring the Grafting Density of Nanoparticles in Solution by Analytical Ultracentrifugation and total Organic Carbon Analysis", Sep. 12, 2012, Analysis Chem., vol. 84, pp. 9238-9245.
Bie et al., "Polydopamine Wrapping Silicon Cross-Linked with Polyacrylic Acid as High-Performance Anode for Lithium-Ion Batteries", Jan. 25, 2016, ACS Appl. Mater., Interfaces, vol. 8, pp. 2899-2904.
Cao et al., "Effect of Binder Architecture on the Performance of Silicon/Graphite Composite Anodes for Lithium Ion Batteries", Jan. 4, 2018, ACS Appl. Mater., Interfaces, vol. 10, pp. 3470-3478.
Caroll et al., "Tuning Confinement in Colloidal Silicon Nanocrystals with Saturated Surface Ligands", Apr. 16, 2018, Nano Lett., vol. 18, pp. 3118-3124.

(Continued)

*Primary Examiner* — Christopher P Domone
(74) *Attorney, Agent, or Firm* — Foley & Lardner LLP

(57) ABSTRACT

A composition includes a silicon nanoparticle having surface-attached groups, and the silicon nanoparticle is represented by the formula:

[Si]-[linker]-[terminal group].

In the formula [Si] represents the surface of the silicon nanoparticle; [terminal group] is a moiety that is configured for further reaction or is compatible with the electrolyte; and [linker] is a group linking the surface of the silicon nanoparticle to the [terminal group].

4 Claims, 26 Drawing Sheets

(56) References Cited

PUBLICATIONS

Chae et al., "Confronting Issues of the Practical Implementation of Si Anode in High-Energy Lithium-Ion Batteries", Sep. 6, 2017, Joule, vol. 1, pp. 47-60.

Chan et al., "Surface Chemistry and Morphology of the Solid Electrolyte Interphase on silicon Nanowire Lithium-Ion Battery Anodes", Apr. 15, 2009, Journal of Power Sources, vol. 189, Issue 2, pp. 1132-1140.

Chen et al., "Effect of Vinylene Carbonate (VC) as Electrolyte Additive on Electrochemical Performance of Si Film Anode for Lithium Ion Batteries", Dec. 6, 2007, Journal of Power Sources, vol. 174, Issue 2, pp. 538-543.

Chen et al., "Enhancing Electrochemical Performance of Silicon Film Anode by Vinylene Carbonate Electrolyte Additive", Aug. 29, 2006, Electrochem. Solid-State Lett., vol. 9, Issue 11, pp. A512-A515.

Choi et al., "Effect of Fluoroethylene Carbonate Additive on Interfacial Properties of Silicon thin-film Electrode", Oct. 27, 2006, Journal of Power Sources, vol. 161, pp. 1254-1259.

Clark et al., "From Hydrogen Silsequioxane to Functionalized Silicon Nanocrystals", Oct. 17, 2016, Chem. Mater., vol. 29, pp. 80-89.

Drdacky et al., "Standardization of Peeling Tests for Assessing the Cohesion and Consolidation Characteristics of Historic Stone Surfaces", Apr. 2012, Materials and Structures, vol. 45, Issue 4, pp. 505-520.

Du et al., "Surface Binding of Polypyrrole on Porous Silicon Hollow Nanospheres for Li-Ion Battery Anodes with High Structure Stability", Jul. 22, 2014, Adv. Mater., vol. 26, pp. 6145-6150.

Erk et al., "Toward Silicon Anodes for Next-Generation Lithium Ion Batteries: A Comparative Performance Study of Various Polymer Binders and Silicon Nanopowders", Aug. 1, 2013, ACS Appl. Mater., Interfaces, vol. 5, pp. 7200-7307.

Feng et al., "Silicon-Based Anodes for Lithium-Ion Batteries: From Fundamentals to Practical Applications", Small, Feb. 22, 2018, vol. 14, pp. 1-33.

Gao et al., "General Method of Manipulating Formation, Composition, and Morphology of Solid-Electrolyte Interphases for Stable Li-Alloy Anodes", Oct. 30, 2017, J. Am. Chem. Soc., vol. 139, pp. 17359-17367.

Goriparti et al., "Review on Recent Progress of Nanostructured Anode Materials for Li-Ion Batteries", Jul. 1, 2014, Journal of Power Sources, vol. 257, pp. 421-443.

Hanrahan et al., "Characterization of Silicon Nanocrystal Surfaces by Multidimensional Solid-State NMR Spectroscopy", Nov. 22, 2017, Chem. Mater., vol. 29, Issue 24, pp. 10330-10351.

Hays et al., "What Makes Lithium Substituted Polyacrylic Acid a Better Binder than Polyacrylic Acid for Silicon-Graphite Composite Anodes?", Mar. 4, 2018, Journal of Power Sources, vol. 384, 28 pages.

Hays et al., Si Oxidation and H2 Gassing During Aqueous Slurry Preparation for Li-Ion Battery Anodes, Apr. 24, 2018, J. Phys. Chem. C, vol. 122, pp. 9746-9754.

He et al., "Alumina-Coated Patterned Amorphous Silicon as the Anode for a Lithium-Ion Battery with High Coulombic Efficiency", Nov. 9, 2011, Adv. Mater., vol. 23, Issue 42, pp. 4938-4941.

Higgins et al., "A Commercial Conducting Polymer as Both Binder and Conductive Additive for Silicon Nanoparticle-Based Lithium-Ion Battery Negative Electrodes", Mar. 3, 2016, ACS Nano, vol. 10, pp. 3702-3713.

Hu et al., "Hybrid Micellar Hydrogels of a Thermosensitive ABA Triblock Copolymer and Hairy Nanoparticles: Effect of Spatial Location of Hairy Nanoparticles of Gel Properties", Sep. 2, 2014, Langmuir, vol. 30, pp. 11212-11224.

Hu et al., "The Existence of Optimal Molecular Weight for Poly(acrylic acid) Binders in Silicon/Graphite Composite Anode for Lithium-ion Batteries", Feb. 28, 2018, Journal of Power Sources, vol. 378, pp. 671-676.

Hu et al., "Understanding of Pre-Lithiation of Poly(acrylic acid) Binder: Striking the Balances between the Cycling Performance and Slurry Stability for Silicon-Graphite Composite Electrodes in Li-ion Batteries", Mar. 15, 2019, Journal of Power Sources, vol. 416, pp. 125-131.

Jiang et al., "Surface-Functionalized Silicon Nanoparticles as Anode Material for Lithium-Ion Battery", Nov. 28, 2018, ACS Appl. Mater. Interfaces, vol. 10, pp. 44924-44931.

Jiang et al., "Tailoring the Surface of Silicon Nanoparticles for Enhanced Chemical and Electrochemical Stability for Li-Ion Batteries", Sep. 10, 2019, ACS Appl. Energy Mater., vol. 2, 6176-6183.

Jin et al., "Understanding Fluoroethylene Carbonate and Vinylene Carbonate Based Electrolytes for Si Anodes in Lithium Ion Batteries with NMR Spectroscopy", Jul. 6, 2018, J. Am. Chem. Soc., vol. 140, pp. 9854-9867.

Jo et al., "Stabilizing the Solid Electrolyte Interphase Layer and Cycling Performance of Silicon-Graphite Battery Anode by Using a Binary Additive of Fluorinated Carbonates", Sep. 26, 2016, J. Phys. Chem. C vol. 120, 22466-22475.

Karkar et al., "A Comparative Study of Polyacrylic acid (PAA) and Carboxymethyl Cellulose (CMC) Binders for Si-Based Electrodes", Nov. 2017, Electrochimica Acta, vol. 258, pp. 453-466.

Kortshagen et al., "Nonthermal Plasma Synthesis of Nanocrystals: Fundamental Principles, Materials, and Applications", Aug. 23, 2016, Chem Rev., vol. 116, pp. 11061-11127.

Kovalenko et al., "A Major Constituent of Brown Algae for Use in High-Capacity Li-Ion Batteries", Oct. 7, 2011, Science, vol. 334, pp. 75-79.

Kwon et al., "Electron/Ion Transport Enhancer in High Capacity Li-Ion Battery Anodes", Aug. 30, 2016, Chem. Mater., vol. 28, pp. 6689-6697.

Li et al., "A Mechanically Robust and Highly Ion-Conductive Polymer-Blend Coating for High-Power and Long-Life Lithium-Ion Batter Anodes", Jan. 7, 2015, Adv. Mater., vol. 27, pp. 130-137.

Li et al., "Effect of Surface Modification on Electrochemical Performance of Nano-sized as an Anode Material for Li-ion Batteries", Apr. 1, 2016, RSC Adv., vol. 6, Issue 41, pp. 34715-34723.

Li et al., "Sodium Carboxymethyl Cellulose: A Potential binder for Si Negative Electrodes for Li-Ion Batteries", Feb. 2007, Electrochemical and Solid-State Letters, vol. 10, Issue 2, pp. A17-A20.

Li et al., "Surface Functionalization of Silicon Nanoparticles Produced by Laser-Drive Pyrolysis of Silane followed by HF-HNO3 Etching", Apr. 24, 2004, Langmuir, vol. 20, No. 11, pp. 4720-4727.

Lim et al., "Physically Cross-Linked Polymer Binder Induced by Reversible Acid-Base Interaction for High-Performance Silicon Composite Anodes", Oct. 7, 2015, ACS Appl. Mater. Interfaces, vol. 7, pp. 23545-23553.

Limpens et al., "Nonthermal Plasma-Synthesized Phosphorus-Boron co-Doped Si Nanocrystals: A New Approach to Nontoxic NIR-Emitters", May 9, 2019, Chem. Mater., vol. 31, pp. 4426-4435.

Limpens et al., "Size-Dependent Asymmetric Auger Interactions in Plasma-Produced n- and -Type-Doped Silicon Nanocrystals", Feb. 13, 2019, J. Phys. Chem. C., vol. 123, pp. 5782-5789.

Ling et al., "Investigating the Doping Mechanism of Pyrene Based Methacrylate Functional Conductive Binder in Silicon Anodes for Lithium-Ion batteries", Journal of The Electrochemical Society, Apr. 2017, vol. 164, Issue 4, pp. A545-A548.

Magasinski., "Toward Efficient Binders for Li-Ion Battery Si-Based Anodes: Polyacrylic Acid", Nov. 2010, vol. 2, No. 11, pp. 3004-3010.

Mangolini et al., "High-Yield Plasma Synthesis of Luminescent Silicon Nanocrystals", Apr. 2005, Nano Letters, vol. 5, No. 4, pp. 655-659.

Mu et al., "Inorganic-organic Interpenetrating Polymer Networks Involving Polyhedral Oligomeric Silsesquioxane and Poly(ethylene Oxide)", Feb. 23, 2007, Polymer Communication, vol. 48, Issue 5, pp. 1176-1184.

Munaoka et al., "Ionically Conductive Self-Healing Binder for Low Cost Si Microparticles Anodes in Li-Ion Batteries", May 15, 2018, Adv. Energy Mater., vol. 8, Issue 14, pp. 1-11.

Nadimpalli et al., "Quantifying Capacity Loss due to Solid-Electrolyte-Interphase Layer Formation on Silicon Negative Electrodes in Lithium-ion Batteries", May 2012, Journal of Power Sources, vol. 215 pp. 1-15.

(56) References Cited

PUBLICATIONS

Nguyen et al., "Systematic Investigation of Binders for Silicon Anodes: Interactions of Binder with Silicon Particles and Electrolytes and Effects of Binders on Solid Electrolyte Interphase Formation", May 2, 2016, ACS Appl. Mater. Interfaces, vol. 8, 12211-12220.

Nitta., "Li-ion Battery Materials: Present and Future", Jun. 2015, Materials Today, vol. 18, No. 5, pp. 252-264.

Oliver et al., "Molecular Structure and Fracture Properties of ZrOx/Epoxysilane Hybrid Films", Jun. 12, 2010, J. Sol-Gel Sci. Technol., vol. 55, pp. 360-368.

Park et al., "Side-Chain Conducting and Phase-Separated Polymeric Binders for High-Performance Silicon Anodes in Lithium-Ion batteries", Feb. 3, 2015, J. Am. Chem. Soc., vol. 137, pp. 2565-2571.

Philippe et al., "Role of the LIPF6 Salt for the Long-Term Stability of Silicon Electrodes in Li-Ion Batteries—A Photoelectron Spectroscopy Study", Jan. 16, 2013, Chem. Mater., vol. 25, pp. 394-404.

Rezqita et al., "The Effect of Electrolyte Additives on Electrochemical Performance of Silicon/Mesoporous Carbon (Si/MC) for Anode Materials for Lithium-Ion Batteries", Sep. 2017, Electrochimica Acta, vol. 247, pp. 600-609.

Rodrigues et al., "Quantifying Gas Generation from Slurries Used in Fabrication of Si-Containing Electrodes for Lithium-Ion Cells", Aug. 15, 2018, Journal of Power Sources, vol. 395, pp. 289-294.

Roduner, "Size Matters: Why Nanomaterials are Different", Jul. 2006, Chem. Soc. Rev., vol. 35, pp. 583-592.

Shobukawa et al., "Electrochemical Performance and Interfacial Investigation on Si Composite Anode for Lithium Ion Batteries in Full Cell", Aug. 1, 2017, Journal of Power Sources, vol. 359, pp. 173-181.

Smith et al., "Infared Spectra-Structure Correlations for Organosilicon Compounds", Spectrochimica Acta, 1960, vol. 16, pp. 87-105.

Song et al., "Strategy for Boosting Li-Ion Current in Silicon Nanoparticles", Aug. 27, 2018, ACS Energy Lett., vol. 3, pp. 2252-2258.

Su et al., "Enhancement of the Cyclability of a Si/Graphite@Graphene Composite as Anode for Lithium-ion Batteries", Jan. 2014, Electrochimica Acta, vol. 116, pp. 230-236.

Sun et al., "Design of Red Phosphorus Nanostructured Electrode for Fast-Charging lithium-Ion Batteries with High Energy Density", Apr. 17, 2019, Joule, vol. 3, pp. 1080-1093.

Szczech et al., "Nanostructured Silicon for High Capacity Lithium Battery Anodes", Jan. 1, 2011, Energy & Environmental Science, vol. 4, pp. 56-72.

Tang et al., "Hollow Carbon Nanospheres with Superior Rate Capability for Sodium-Based Batteries", Jul. 2012, Adv. Energy Mater., vol. 2, Issue 7, pp. 873-877.

Touidjine et al., "Partially Oxidized Silicon Particles for Stable Aqueous Slurries and Practical Large-Scale Making of Si-Based Electrodes", Aug. 2015, vol. 162, Issue 8, pp. A1466-A1475.

Vreugdenhil et al., "Nanostructured Silicon Sol-gel Surface treatments for AI 2024-T3 Protection", Apr. 2001, Journal of Coatings Technology, vol. 73, No. 915, pp. 35-43.

Wei et al., "High Performance Polymer Binders Inspired by Chemical Finishing of Textiles for Silicon Anodes in Lithium Ion Batteries", Oct. 2, 2017, J. Mater. Chem. A., vol. 5, Issue 42, pp. 22156-22162.

Wheeler et al., "Silyl Radical Abstraction in the Functionalization of Plasma-Synthesized Silicon Nanocrystals", Sep. 10, 2015, Chem. Mater., vol. 27, pp. 6869-6878.

Wu et al., "Designing Nanostructured Si Anodes for High Energy Lithium Ion Batteries", Oct. 2012, Nano Today, vol. 7, Issue 5, pp. 414-429.

Wu et al., "Toward an Ideal Polymer Binder Design for High-Capacity Battery Anodes", Jul. 15, 2013, J. Am. Chem. Soc., vol. 135, pp. 12048-12056.

Xu et al., "Electrolytes for Advanced Lithium Ion Batteries using Silicon-based Anodes", Mar. 23, 2019, J. Mater. Chem. A., vol. 7, pp. 9432-9446.

Xu et al., "Improved Performance of the Silicon Anode for Li-Ion Batteries: Understanding the Surface Modification Mechanism of Fluoroethylene Carbonate as an Effective Electrode Additive", Mar. 12, 2015, Chem. Mater., vol. 27, pp. 2591-2599.

Xu et al., "Mechanical Properties and Chemical Reactivity of LixSiOy Thin Films", Oct. 15, 2018, CAS Appl. Mater. Interfaces, vol. 10, p. 38558-38564.

Xu et al., "Scalable Synthesis of Spherical Si/C Granules with 3D Conducting Networks as Ultrahigh Loading Anodes in Lithium-ion Batteries", May 2018, Energy Storage Materials, vol. 12, pp. 54-60.

Xu et al., "Watermelon-Inspired Si/C Microspheres with Hierarchical Buffer Structures for Densely Compacted Lithium-Ion Battery Anodes", Feb. 8, 2017, Adv. Energy Mater., vol. 7, pp. 1-6.

Xun et al., "Improved Initial Performance of Si Nanoparticles by Surface Oxide Reduction for Lithium-Ion battery Application", Jan. 2011, vol. 14, Issue 5, pp. A61-A63.

Xun et al., "The Effects of Native Oxide Surface Layer on the Electrochemical Performance of Si Nanoparticle-based Electrodes", Dec. 2011, Journal of the Electrochemical Society, vol. 158, No. 12, pp. A1260-A1266.

Zhang et al., "Silicon Nanoparticles: Stability in Aqueous Slurries and the Optimization of the Oxide Layer Thickness for Optimal Electrochemical Performance", Aug. 30, 2017, ACS Appl. Mater. Interfaces, vol. 9, pp. 32727-32736.

Zhang., "Advanced Electrolyte/Additive for Lithium-ion Batteries with Silicon Anode", Aug. 2016, Current Opinion in Chemical Engineering, vol. 13, pp. 24-35.

SURFACE-FUNCTIONALIZED SILICON ANODE FOR HIGH ENERGY LITHIUM ION BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to anode materials for lithium ion batteries. More specifically, it is related to surface-functionalized silicon nanoparticles for use as anode materials.

BACKGROUND

The exploration for the next generation of anode materials in the lithium-ion batteries is quite topical in the energy storage field, particularly due to the high demand for high energy batteries for use in portable electronics and electric vehicles. Silicon (Si) stands out among all the candidate anode materials for its high theoretical specific capacity (4200 mAh/g for $Li_{4.4}Si$), safety (i.e. low or no flammability), and low cost. However, the high surface reactivity of commercial Si particles and the instability of lithiated silicon ($Li_xSi$) with its surrounding environment presents challenges for its use in lithium ion batteries. Electrolytes and additives that passivate the Si surface have been explored to address this issue. For example, fluoroethylene carbonate (FEC) is one of the few electrolyte additives identified to be effective in performance improvement of Si-based anodes. Another approach has been to modify the surface functionality through organic synthesis. A variety of functional groups such as —SiOH, —Si$(CH_2)_3$COOH, —Si—O—Si, epoxy, and oligoethers have been attached to the surface of silicon particles, however, such materials have provided only small improvements in performance.

SUMMARY

In one aspect, a composition comprises a silicon nanoparticle having surface-attached groups, and the silicon nanoparticle is represented by the formula:

[Si]-[linker]-[terminal group]

wherein: [Si] represents the surface of the silicon nanoparticle; [terminal group] is a moiety that is configured for further reaction or is compatible with the electrolyte; and [linker] is a group linking the surface of the silicon nanoparticle to the [terminal group].

In some embodiments, the silicon nanoparticle comprising surface attached groups is represented as:

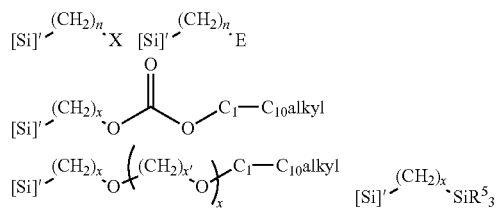

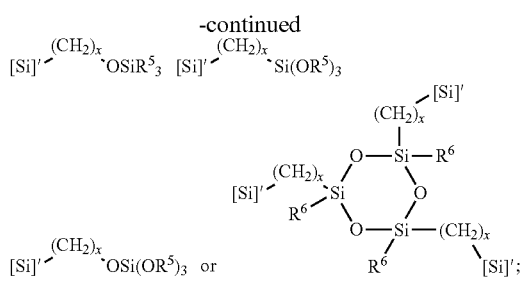

wherein:
[Si]' represents [Si] or a group of formula:

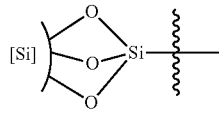

E is epoxy or ethylene carbonate;
X is CN, F, Cl, Br, or I;
each x is individually 1 to 10;
each $R^5$ is individually alkyl or —Oalkyl; and
each $R^6$ is individually alkyl.

In some embodiments, the silicon nanoparticle may be represented as:

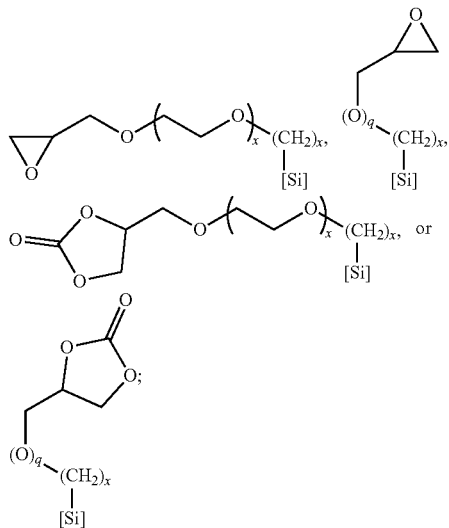

wherein: each x is individually 1-10 and q is 0 or 1.

In another aspect, a polymeric composite for an electrochemical cell is provided, the polymeric composite comprising a silicon nanoparticle covalently attached to an acid-functional polymer. In some embodiments, the polymer composite is the reaction product of an epoxy-functional silicon nanoparticle and the porous, acid-functional polymer.

In another aspect, an anode for a secondary lithium or sodium ion battery is provided, the anode comprising any composition described herein that includes a silicon nanoparticle having surface attached groups.

In another aspect, a secondary electrochemical cell is provided including any of the anodes described herein that include a a silicon nanoparticle having surface attached groups.

In another aspect, a process is provided for forming a functionalized silicon nanoparticle, the process comprising: contacting a silicon nanoparticle (SiNP) with an aqueous solution of HF to form a treated SiNP; contacting the treated SiNP with an olefin in the presence of a hydrosilylation catalyst to form the functionalized silicon nanoparticle.

In another aspect, a process is provided for forming a functionalized silicon nanoparticle, the process comprising: contacting a silicon nanoparticle (SiNP) having surface —OH groups with a siloxane having a Si—OR moiety, where R is an alkyl group, and the contacting comprises a condensation to eliminate an alcohol.

DETAILED DESCRIPTION

Figure 1A:
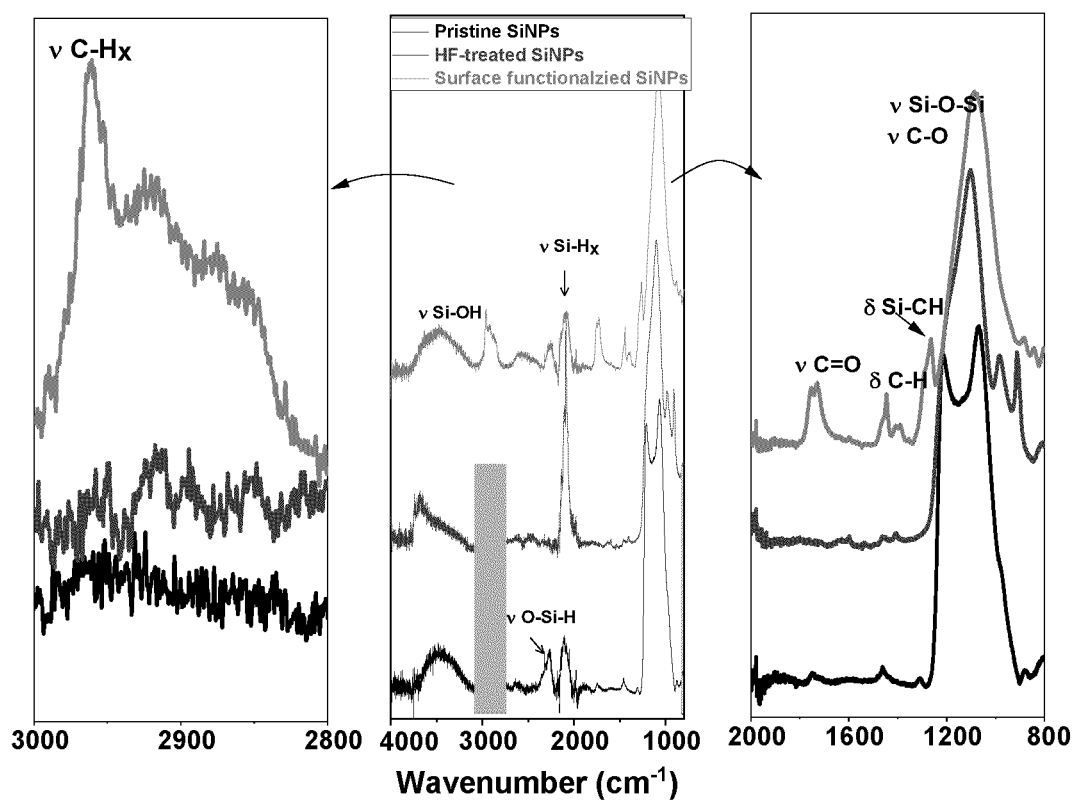
FIGS. 1A and 1B are schematic procedures for the synthesis of carbonate- or epoxy-functionalized SiNPs, respectively, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

The present technology is directed to lithium and/or sodium ion batteries having a silicon-based anode. It has now been found that silicon nanoparticles (SiNPs) may be functionalized with various organic groups prior to electrode formation. Upon electrode formation/preparation, the functionalized SiNPs may be included in an electrode blend with a binder, and/or with a polymer to which they may be bound, and other materials for application to the current collector. The SiNPs are the anode active material that interacts with the lithium or sodium ions upon discharge, and releases the lithium or sodium to the cathode upon charging. The functionalization on the SiNPs has been found to allow for, in some embodiments, binding to and anchoring of the SiNP by a polymer to form a polymer composite, and in other embodiments to form an artificial solid electrolyte interphase (A-SEI) layer. Typically, the SEI is formed during charging and/or discharging of the device. However, by incorporating functional groups on the SiNP, it is believed that they form an SEI-like layer that provides a similar function.

Inspired by these efforts and the urge to improve the way SEI forms on Si electrode surface, a new Si anode material has been prepared with an artifical SEI (ASEI) group to regulate the SEI formation. The ASEI group, which is the analog to the carbonate electrolyte solvent, boosts the electrochemical performance of pure silicon anodes in both Li/Si half-cells and Si/NMC full cells by forming a protective layer on the surface of the Si particle prior to electrode fabrication, participating in the SEI formation during cell operation, and keeping intimate contact between the SEI and electrode surface with strong Si—C covalent bond. It is anticipated that the surface and interface engineering strategy, by regulating organic surface groups, will pave the way to wide application of lithium ion batteries having a silicon anode.

According to various embodiments herein, it has now been observed that a cyclic carbonate group may be grafted onto the surface of a silicon particle that has been pre-etched by treatment with an HF solution. The surface functionalization may be performed in one-step on the particle level using a platinum-catalyzed hydrosilylation reaction. The surface carbonate groups that are formed, which are analogous to a number of electrolyte solvents for use in lithium ion batteries, help to improve the electrochemical performance by participating in the formation of an SEI layer. The SEI layer provides a stable protection layer to the anode. In comparison, silicon nanoparticles that have not been treated with HF, or other agent, (i.e. "pristine SiNPs"), are not amenable to functionalization, and they lead to uncontrolled electrode surfaces with unpredictable behaviors.

As will be further explained below, a hydrosilylation reaction or silanol-siloxane reactions may be employed to functionalize the surface of the SiNPs or silicon nanocrystals with organic groups. The functional groups are designed to facilitate lithium ion conduction, promote electrode integrity, reduce electrode/electrolyte contact, and/or to form a resilient SEI layer by decomposition or polymerization on the electrode surface. The surface functionalized silicon nanoparticles (SF-SiNPs), show improvement in the chemical and electrochemical stability of various cells, and this has now been as in both half- and full-cells. It has also been found that the functionalization of the silicon nanoparticle surface after etching by HF, or like agent, is not limited to carbonate functionalization. Rather, the surface may be functionalized with a wide variety of groups as described herein.

In one aspect, a composition is provided that includes a silicon nanoparticle having surface-attached groups, and the silicon nanoparticle is represented by the formula:

[Si]-[linker]-[terminal group].

In this formula, [Si] represents the surface of the silicon nanoparticle; [terminal group] is a moiety that is configured for further reaction or is compatible with the electrolyte; and [linker] is a group linking the surface of the silicon nanoparticle to the [terminal group].

In the compositions, the [linker] may include an alkylenyl group; an alkylenyl group interrupted by oxygen atoms; or a group of formula —OSiR$^a$R$^b$R$^c$, wherein R$^a$ and R$^b$ are individually an oxygen atom that is also connected to the surface of the silicon nanoparticle, an —O-siloxy group, or an alkyl connected to a functional group; and R$^c$ is an alkylenyl group or an alkylenyl group interrupted by oxygen atoms, and R$^c$ is connected to [terminal group]. In some embodiments, the [terminal group] is F, Cl, Br, I, CN, —P(O)(OR$^{10}$)$_2$, substituted or unsubstituted alkyl, substituted or unsubstituted cycloalkyl, substituted or unsubstituted heterocyclyl, substituted or unsubstituted silyl, or substituted or unsubstituted siloxyl; and each R$^{10}$ is individually a substituted or unsubstituted alkyl. In some embodiments, the [linker] is —(CH$_2$)$_x$— and x is from 1 to 10. In other embodiments, the [linker] is —((CH$_2$)$_x$O)$_x$—, x is from 1 to 10, and x' is 1, 2, or 3, and the orientation of the group is preserved.

The SiNPs are, of course, nanoparticulate materials that are generally spherical. The SiNP have typical dimensions on the order of about 10 nm to about 100 nm. The SiNPs are typically prepared by thermal or non-thermal plasma synthesis techniques.

In other embodiments, the silicon nanoparticle may be represented by the formula:

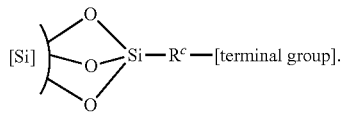

In this formula, R$^c$ is an alkylenyl group or an alkylenyl group interrupted by oxygen atoms. The oxygen atomes bridging to the surface are those resulting from the condensation reaction between surface hydroxyl groups and the siloxane. In such embodiments, R$^c$ may be —(CH$_2$)$_x$— or —((CH$_2$)$_x$O)$_x$—, and x is from 1 to 10, and x' is 1, 2, or 3, and the orientation of the group is preserved. As used herein, "the orientation of the group is preserved," is intended to mean that as drawn the left end of the R$^c$ attaches to the briding Si atom, while the right end of the R$^c$ as represented is attached to the terminal group.

In some embodiments, the [linker] is a group of formula —OSiR$^a$R$^b$R$^c$, wherein R$^a$ and R$^b$ are individually an alkyl connected to a functional group; and R is an alkylenyl group or an alkylenyl group interrupted by oxygen atoms. In some embodiments, the [terminal group] is an alkyl, a fluorinated alkyl, a carbonate, a fluorinated carbonate, a vinylene carbonate, a fluorinated vinylene carbonate, a sultone, a fluorinated sultone, a phosphonate, a fluorinated phosphonate, an oxalate, a fluorinated oxalate, an ester, a fluorinated ester, an anhydride, or a fluorinated anhydride.

In other embodiments, the silicon nanoparticle including surface attached groups may be represented as:

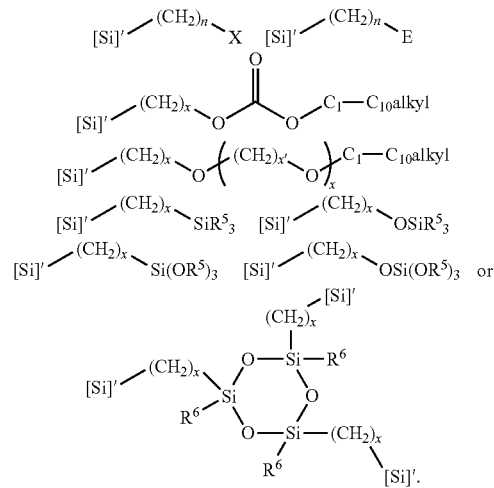

In the above structures, [Si]' represents [Si] or a group of formula:

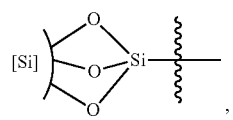

E is epoxy or ethylene carbonate; X is CN, F, Cl, Br, or I; each x is individually 1 to 10; each R$^5$ is individually alkyl or —Oalkyl; and each R$^6$ is individually alkyl.

Some of the compositions may include a silicon nanoparticle comprising surfaced attached groups of formula —R$^1$—R$^2$—R$^3$. In such formulae, R$^1$ may be an alkylenyl that is attached to the silicon nanoparticle surface; R$^2$ may be absent or is a group of formula —(O-alkyl)$_n$-; n may be from 1 to 10; R$^3$ may be F, Cl, Br, I, CN, —P(O)(OR$^{10}$)$_2$, substituted or unsubstituted alkyl, substituted or unsubstituted cycloalkyl, substituted or unsubstituted heterocyclyl, substituted or unsubstituted silyl, or substituted or unsubstituted siloxyl; and each R$^{10}$ may individually be a substituted or unsubstituted alkyl. In any of the above embodiments, R$^1$ may be —(CH$_2$)$_x$—, and x may be from 1 to 10. In any of the above embodiments, R$^2$ may be a group of formula —(O-alkyl)$_n$-, and alkyl may be a C$_1$-C$_{10}$ alkyl. In any of the above embodiments, R$^2$ may be —(O—CH$_2$)$_n$—, —(O—CH$_2$CH$_2$)$_n$—, or —(O—CH$_2$CH$_2$CH$_2$)$_n$—; and n may be 1, 2, 3, or 4. In some embodiments, R$^2$ may be absent. In any of the above embodiments, R$^3$ may be alkyl, fluorinated alkyl, carbonate, fluorinated carbonate, vinylene carbonate, fluorinated vinylene carbonate, sultone, fluorinated sultone, phosphonate, fluorinated phosphonate, oxalate, fluorinated oxalate, ester, fluorinated ester, anhydride, or fluorinated anhydride. For example, R$^3$ may be F, Cl, Br, I, CN, methyl, ethyl, propyl, iso-propyl, n-butyl, sec-butyl, t-butyl, epoxy, a cyclic carbonate, an alkylcarbonate, pyridyl, piperidinyl, morpholino, siloxyl, or silyl.

In the compositions, the silicon nanoparticle may include a surface-attached group of one or more of the formulae, where  represents the silicon nanoparticle surface:

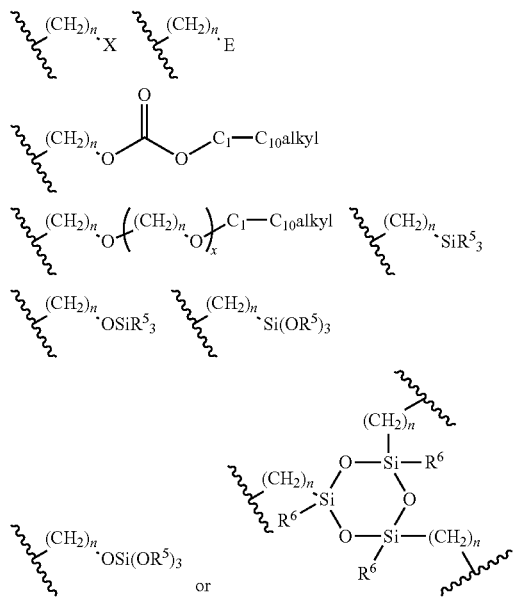

such formulae, E may be epoxy or ethylene carbonate; X may be CN, F, Cl, Br, or I; n may be from 1 to 10; each $R^s$ may individually be alkyl or -Oalkyl; and each $R^6$ may individually be alkyl.

In various embodiments, the silicon nanoparticle may be represented as one or more of: $—H_2CCH_2CH_2CN$, $—H_2CCH_2CH_2F$, $—H_2CCH_2CH_2Cl$, $—H_2CCH_2CH_2Br$, $—H_2CCH_2CH_2O(CH_2CH_2O)_xCH_3$, $—H_2CCH_2CH_2O(CH_2CH_2O)_xCH_3$,

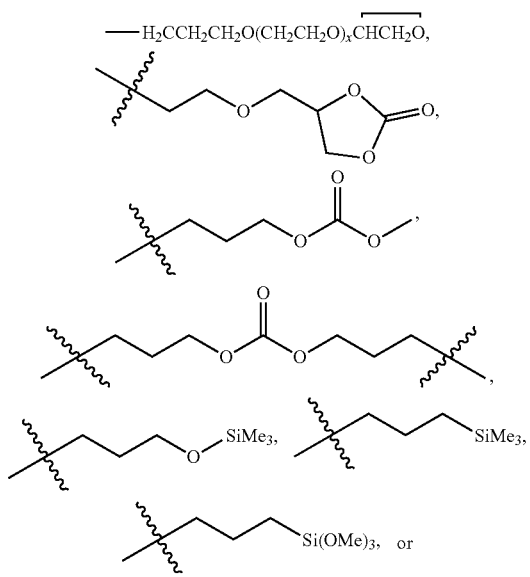

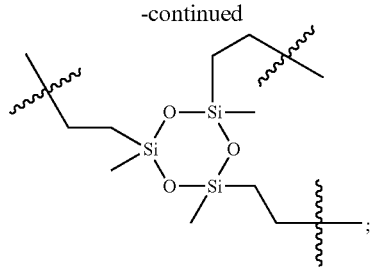

where  represents the silicon nanoparticle surface.

Accordingly, the silicon nanoparticle may be represented as one or more of:

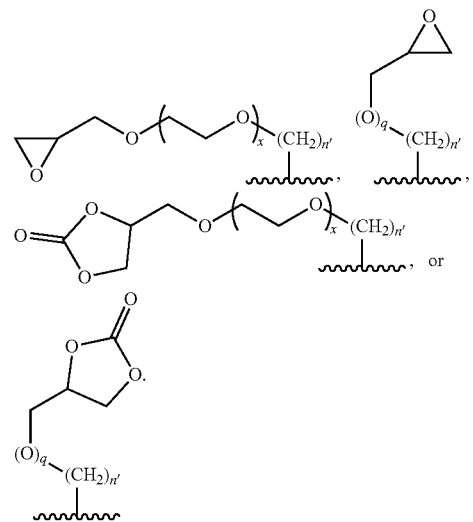

In such formulas,  represents the silicon nanoparticle surface, n' may be from 0-10, x may be 1-10, and q may be 0 or 1.

In another aspect, a composition comprises a silicon nanoparticle comprising the reaction product of a hydroxy functional surface on the silicon nanoparticle and a siloxane. The siloxane, in some embodiments, may be an epoxy functionalized siloxane. The epoxy functionalized siloxane may be a compound of general formula $Si(OR^{20})_3R^{21}$, wherein each $R^{20}$ may be independently alkyl, and $R^{21}$ may be an alkyl, an epoxyalkyl, or an epoxyalkyl$^a$ where the alkyl$^a$ may be interrupted by ether and/or ester groups. In some embodiments, $R^{20}$ may be methyl, ethyl, n-propyl, isopropyl, n-butyl, sec-butyl, or tert-butyl. In some embodiments, $R^{21}$ may be alkyl. In some embodiments, $R^{21}$ may be $C_1$-$C_{20}$ alkyl. In some embodiments, $R^{21}$ may be represented as

wherein t and t' are independently 1, 2, 3, 4, 5, or 6.

The reaction product is the result of a condensation reaction between the surface bound silanol groups and the siloxane to expel an alcohol. The SiNPs may first be functionalized with —OH (i.e. "silanol") groups on the surface by reacting them with an oxidant such as hydrogen peroxide ($H_2O_2$). As noted above, the silanol groups may then be the point of attachment for the siloxane. For example, $R^{20}$ may be short chain alkyl group such as ethyl. Upon reaction of the siloxane with the silanol surface groups, ethanol is expelled and the siloxane is covalently anchored to the surface of the SiNP. Accordingly, in another aspect, a process for forming a functionalized silicon nanoparticle, the process comprising: contacting a silicon nanoparticle (SiNP) with an aqueous solution of $H_2O_2$ to form silanol SiNP; contacting the silanol SiNP with an epoxy functionalized siloxane in an either basic or acidic reaction condition.

In another aspect, a polymer composite is provided that is based upon any of the described functionalized silicon nanoparticles that is covalently bound to a polymer. Such a polymer composite may be the reaction product of an acid-functional polymer and a functionalized silicon nanoparticle, such as an epoxy-functional silicon nanoparticle. Functional silicon nanoparticles are any of those as described above. The polymer may be a porous polymer having acid-functionality, in some embodiments. In some other embodiments, the polymer is an acrylic acid polymer or acrylic acid co-polymer. For example, acrylic acid co-polymers may be polymers based upon acrylic acid with other acrylate or (meth)acrylate or olefinic monomers. The polymer composite so prepared/formed may perform the function as a binder in an electrode due to the presence of the polymer and the properties imparted thereby, but it may also be part of a blend with one or more binders as part of the electrode.

The polymer composite may be a material of formula [Polymer-$R^9$-SiNP], where "Polymer" is an acid-functional polymeric separator this bound to the SiNP through a linker group $R^9$. The $R^9$-SiNP may be the result of binding of any of the functionalized silicon nanoparticles described herein with the Polymer. $R^9$ may be a wide variety of materials, but may include an ester group as a result of the reaction between the acid-functionality of the polymer and the functionality from the SiNP. For example, where the functionalized SiNP is an epoxy-functional SiNP, the reaction product is one of ring opening to form the ester linkage to the acid-functional polymer. In some embodiments, the polymer composite may have a structural unit represented as: Polymer-C(O)OCH$_2$C(OH)CH$_2$(OCH$_2$CH$_2$)$_n$O(CH$_2$)$_{n'}$—SiNP, where n is from 1 to 10 and n' is 0-10, and/or the polymer composite may have a structural unit represented as: Polymer-C(O)OCH$_2$C(OH)CH$_2$(OCH$_2$CH$_2$)$_n$O(CH$_2$)$_n$Si(O)$_3$ SiNP, where the Si(O)$_3$SiNP is the group resulting from the interaction of the silanol functional SiNP with the siloxane. As an alternative representation, and in one embodiment, the polymer composite may have a structure as shown here:

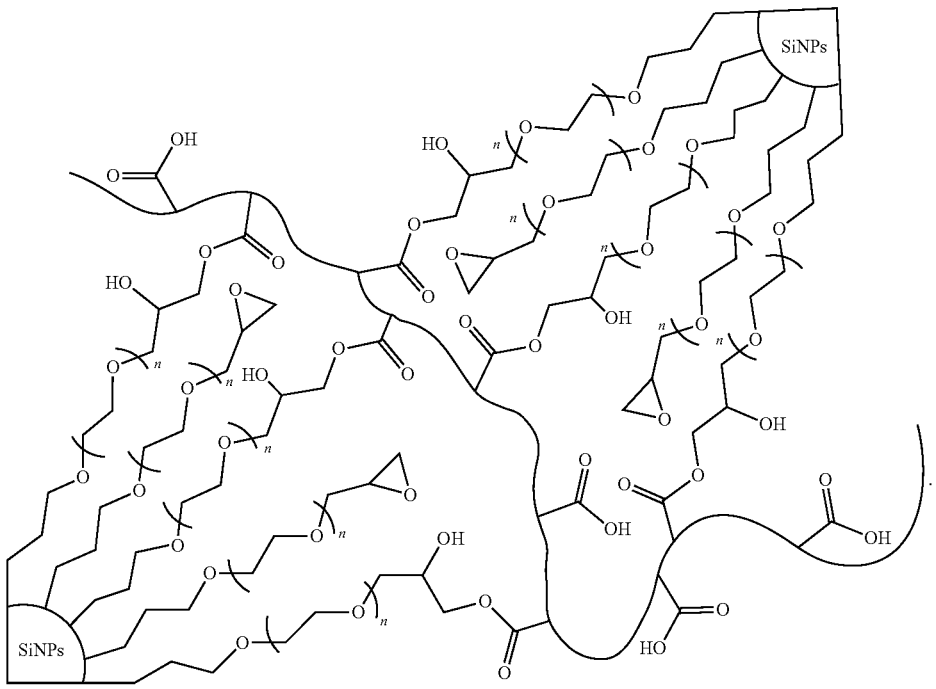

In another aspect, an anode for a secondary lithium or sodium ion battery is provided, where the anode include any of the above compositions and/or polymer composites that include any of the described functionalized SiNPs. The anode may also include any of: additional binders, additives, bulk silicon, and/or a current collector. To be clear, the anode may include any of the above compositions and/or the polymer composite.

The current collector may be any of a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. In some embodiments, the current collector is copper.

As noted above, the anode may include a binder. Where the polymer composite is incorporated into the anode where it alone may function as a binder for the electrode, or the anode may include other binders. When used, the binder may be present in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

The anode may also include bulk silicon. As used herein, "bulk silicon" is used to describe the silicon materials that are typically described as anode materials where Li/Si and/or Na/Si based electrochemical cells are described. The "bulk silicon," as opposed to the SiNPs, may be used in different forms, e.g. in the form of nanowires, nanotubes, nanoparticles, films, nanoporous silicon, silicon nanotubes, or as a silicon/carbon composite material. The functionalized SiNPs are then mixed with the bulk silicon, and any other additives, and applied to the current collector, according to one embodiment. In other embodiments, the functionalized SiNPs may be applied as a layer over the bulk silicon in the electrode.

In some embodiments, the anode for a secondary lithium or sodium ion battery includes silicon nanoparticles having surface attached groups of formula —$R_1$—$R^2$—$R^3$. In such formulae, $R^1$ may be an alkylenyl; $R^2$ may be absent or is a group of formula —(O-alkyl)$_n$-; n may be from 1 to 10; $R^3$ may be F, Cl, Br, I, CN, —P(O)(OR$^{10}$)$_2$, substituted or unsubstituted alkyl, substituted or unsubstituted cycloalkyl, substituted or unsubstituted heterocyclyl, substituted or unsubstituted silyl, or substituted or unsubstituted siloxyl; and each $R^{10}$ may individually be a substituted or unsubstituted alkyl. In any of the above embodiments, $R^1$ may be —(CH$_2$)$_x$—, and x may be from 1 to 10. In any of the above embodiments, $R^2$ may be a group of formula —(O-alkyl)$_n$-, and alkyl may be a $C_1$-$C_{10}$ alkyl. In any of the above embodiments, $R^2$ may be —(O—CH$_2$)$_n$—, —(O—CH$_2$CH$_2$)$_n$—, or —(O—CH$_2$CH$_2$CH$_2$)$_n$—; and n may be 1, 2, 3, or 4. In some embodiments, $R^2$ may be absent. In any of the above embodiments, $R^3$ may be alkyl, fluorinated alkyl, carbonate, fluorinated carbonate, vinylene carbonate, fluorinated vinylene carbonate, sultone, fluorinated sultone, phosphonate, fluorinated phosphonate, oxalate, fluorinated oxalate, ester, fluorinated ester, anhydride, or fluorinated anhydride. For example, $R^3$ may be F, Cl, Br, I, CN, methyl, ethyl, propyl, iso-propyl, n-butyl, sec-butyl, t-butyl, epoxy, a cyclic carbonate, an alkylcarbonate, pyridyl, piperidinyl, morpholino, siloxyl, or silyl.

In the anode, the silicon nanoparticle may include a surface-attached group of one or more of the formulae, where ⁓ represents the silicon nanoparticle surface:

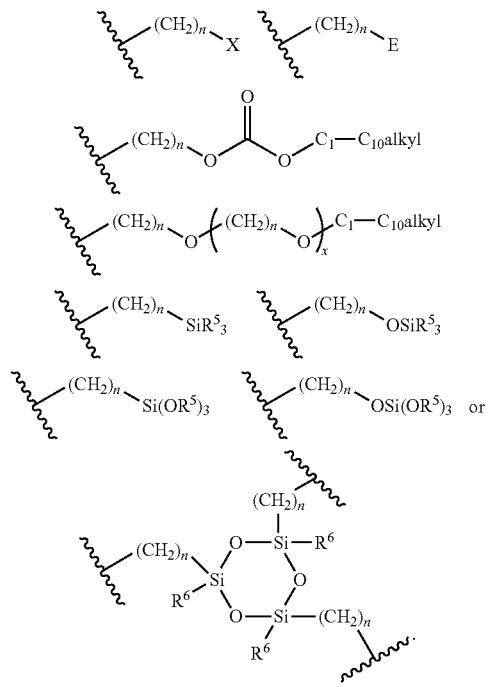

In such formulae, E may be epoxy or ethylene carbonate; X may be CN, F, Cl, Br, or I; n may be from 1 to 10; each $R^5$ may individually be alkyl or —Oalkyl; and each $R^6$ may individually be alkyl.

Accordingly, the silicon nanoparticle of the anode may be represented as one or more of:

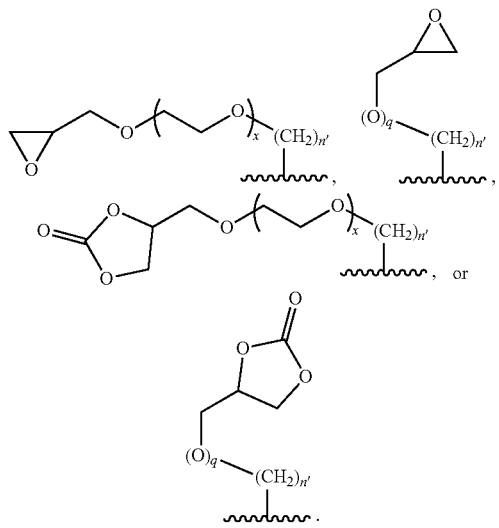

In such formulas, ⁓ represents the silicon nanoparticle surface, n' may be from 0-10, x may be 1-10, and q may be 0 or 1.

In the anode, the silicon nanoparticle may alternatively be described as including a surface-attached group of one or more of the formulae:

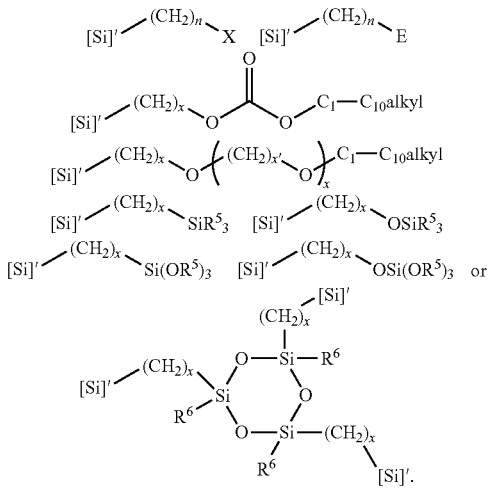

In the above structures, [Si]' represents [Si] or a group of formula:

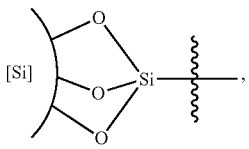

E is epoxy or ethylene carbonate; X is CN, F, Cl, Br, or I; each x is individually 1 to 10; each $R^5$ is individually alkyl or -Oalkyl; and each $R^6$ is individually alkyl.

In some embodiments, the anode for a secondary lithium or sodium ion battery includes silicon nanoparticles having on their surface the reaction product of a hydroxy functional surface on the silicon nanoparticle and a siloxane. This may include where the siloxane is an epoxy functionalized siloxane. As noted above in some embodiments, the siloxane is a compound of general formula $Si(OR^{20})_3R^{21}$, wherein each $R^{20}$ is independently alkyl, and $R^{21}$ is an alkyl, an epoxyalkyl, or an epoxyalkyl$^a$ where the alkyl$^a$ is interrupted by ether and/or ester groups. In some embodiments, $R^{20}$ is methyl, ethyl, n-propyl, isopropyl, n-butyl, sec-butyl, or tert-butyl. In some embodiments, $R^{21}$ is alkyl. In some embodiments, $R^{21}$ is $C_1$-$C_{20}$ alkyl. In some embodiments, $R^{21}$ is represented as

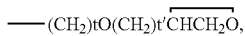

wherein t and t' are independently 1, 2, 3, 4, 5, or 6. The anode may otherwise contain any of the current collectors, binders, additives, bulk silicon, and other materials as described herein.

In another aspect, a secondary electrochemical cell includes a cathode, an electrolyte, and an anode as described herein. The anode, as described herein, includes any of the above composition having surface attached groups on silicon nanoparticles (i.e. the functionalized SiNPs). Such sec-ondary electrochemical cells may further include a separator between the cathode and the anode. In some embodiments, the cathode includes a cathode active material, a binder, and a current collector.

The current collector may be any of a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

As noted above, the cathode may also include a binder. When used, the binder may be present in an amount of from about 0.1 wt % to about 99 wt %. In some embodiments, the binder is present in the cathode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

The cathode active material may be any of a wide variety of lithium-containing cathode active materials including lithium nickel-manganese-cobalt oxide compositions, and the like. In some embodiments, the cathode active material includes, but is not limited to a spinel, olivine, $Li_{1+w}Mn_xNi_yCo_zO_2$, $LiMn_xNi_yO_4$, or $a'Li_2MnO_3 \cdot (1-a')LiMO_2$, wherein 0<w<1, 0≤x<1, 0≤y<1, 0≤z<1, and x+y+z=1; 0≤x'<2, 0≤y'<2, and x'+y'=2; and 0≤a'<2. As used herein, a "spinel" refers to a manganese-based spinel such as, $Li_{1+x}Mn_{2-y}Me_zO_{4-h}A_k$, wherein Me is Al, Mg, Ti, B, Ga, Si, Ni, or Co; A is S or F; and wherein 0≤x≤0.5, 0≤y≤0.5, 0≤z≤0.5, 0≤h≤0.5, and 0≤k≤0.5. The term "olivine" refers to an iron-based olivine such as, $LiFe_{1-x}Me_yPO_{4-h}A_k$, wherein Me is Al, Mg, Ti, B, Ga, Si, Ni, or Co; A is S or F; and wherein 0≤x≤0.5, 0≤y≤0.5, 0≤h≤0.5, and 0≤k≤0. Other cathode active materials may include any of the following, alone or in combination with any of the cathode active materials described herein, a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x}Ni_hMn_kCo_lMe^2_yO_{2-z}F_z$, $VO_2$ or $E_xF_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0 \leq x \leq 0.3$; $0 \leq y \leq 0.5$; $0 \leq z \leq 0.5$; $0 \leq m \leq 2$; $0 \leq n \leq 2$; $0 \leq x' \leq 0.4$; $0 \leq \alpha \leq 1$; $0 \leq \beta \leq 1$; $0 \leq \gamma \leq 1$; $0 \leq h \leq 1$; $0 \leq k \leq 1$; $0 \leq l \leq 1$; $0 \leq y' \leq 0.4$; $0 \leq z' \leq 0.4$; and $0 \leq x'' \leq 3$; with the proviso that at least one of h, k and l is greater than 0. The cathode active material may be accompanied by a conductive carbon material such as natural graphite, synthetic graphite, hard carbon, amorphous carbon, soft carbon, mesocarbon microbeads (MCMB), acetylene black, Ketjen black, carbon black, mesoporous carbon, porous carbon matrix, carbon nanotube, carbon nanofiber, and graphene.

In some embodiments, where the electrochemical device is a sodium ion battery, the cathode active material may include where a sodium counterpart are substituted for the above-illustrated lithium active materials. In some embodiments, where the electrochemical device is a sodium ion battery, the cathode active material may include one or more of $NaNi_{0.5}Mn_{0.5}O_2$, $Na_xMn_{1/3}Fe_{1/3}Cu_{1/6}Mg_{1/6}O_2$, $NaMn_{0.48}Ni_{0.2}Fe_{0.3}Mg_{0.02}Mg_{1/6}O_2$, $Na_{0.85}Li_{0.1}Ni_{0.175}Mn_{0.525}Fe_{0.2}O_2$, $0.5Li_2MnO_3$, $0.5LiMn_{0.42}Ni_{0.42}Co_{0.16}O_2$, $Na_{2/3}[Fe_{1/2}Mn_{1/2}]O_2$, $Na_{0.7}Ni_{0.3}Mn_{0.59}Co_{0.1}Cu_{0.01}O_2$, $Na_{0.67}Mn_{0.67}Ni_{0.33-x}Mg_xO_2$ ($0 \leq x \leq 0.33$), $Na_xCo_{0.1}Mn_{0.9}O_2$, $Na_{0.6}MnO_2$, $Li_2MnO_3$ (Li—O'3), $Na_2RuO_3$, $Na(Li_{1/3}M_{2/3})O_2$, $Na_{0.6}Li_{0.2}Mn_{0.8}O_2$, $Na_{2/3}[Mg_{0.28}Mn_{0.72}]O_2$, or $Na_{0.5}Ni_{0.25}Mn_{0.75}O_2$.

The cathode may be further stabilized by surface coating the active particles with a material that can neutralize acid or otherwise lessen or prevent leaching of the transition metal ions. Hence the cathodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, of any other suitable metal oxide or fluoride. The coating can be applied to a carbon coated cathode. The cathode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrolyte for the electrochemical cells may contain a solvent and a salt dissolved therein. If the cell is a lithium ion cell, the electrolyte may contain a lithium salt. If the cell is a sodium ion cell, the electrolyte may contain a sodium salt. Illustrative lithium salts include, but are not limited to lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2''-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, CsF, $CsPF_6$, $LiN(SO_2CF_3)_2$, $LiN(SO_2F)_2$, $Li_2(B_{12}X_{12-p}H_p)$; $Li_2(B_{10}X_{10-p'}H_{p'})$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10. In some embodiments, the salt may be $LiPF_6$, $LiBF_4$, $LiN(SO_2CF_3)_2$, or $LiN(SO_2F)_2$. Where the salt is a sodium salt any of the above may be used as the sodium salt instead of the lithium salt. The salt may be present in the electrolyte at any amount including from about 0.5 M to 3 M. This may include from about 1 M to about 2M.

As noted, the electrolytes may further include a solvent, which in some embodiments, is a polar aprotic solvent. Such polar aprotic solvents may include, but are not limited to, organic carbonates, fluorinated carbonates, ethers, fluorinated ethers, glymes, other sulfones, organic sulfates, esters, cyclic esters, fluorinated esters, nitriles, amides, dinitriles, fluorinated amides, carbamates, fluorinated carbamates, cyanoester compounds, pyrrolidinium-based ionic liquids, piperidinium-based ionic liquids, imidazolium-based ionic liquids, ammonium-based ionic liquids, phosphonium-based ionic liquids, or cyclic phosphonium-based ionic liquids. In some embodiments, the solvent may be a carbonate, a sulfone, a siloxane, a silane, an ether, an ester, a lactone, ionic liquids, any fluorinated derivatives thereof, or a blend of any two or more such solvents. For example, the solvent may include one or more of dimethyl carbonate, ethyl methyl carbonate (EMC), diethyl carbonate, methyl propyl carbonate, ethyl propyl carbonate, dipropyl carbonate, dimethoxyethane, triglyme, propylene carbonate (PC), dimethylvinylene carbonate, tetraethyleneglycol, dimethyl ether, polyethylene glycols, γ-butyrolactone, ethylene carbonate (EC), difluoroethylene carbonate (DFEC), fluoroethylmethylcarbonate (FEMC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, or perfluorobutyl ethyl carbonate, as well as fluorinated solvents and fluorinated version of any of the foregoing solvents with being just two examples. In some embodiments, the non-aqueous solvent is one or more of PC, EC, EMC, DFEC, or FEMC. In some embodiments, the solvent is a piperidinium-based ionic liquid or an imidazolium-based ionic liquid.

In another aspect, a process is provided for forming a functionalized silicon nanoparticle. The process includes contacting a silicon nanoparticle (SiNP) with an aqueous acid solution to form a treated SiNP and contacting the treated SiNP with an olefin in the presence of a hydrosilylation catalyst to form the functionalized silicon nanoparticle. In some embodiments, the aqueous acid solution includes HF. Illustrative hydrosilylation catalysts include, but not limited to, Pt, Pd, Pt/C, and Pd/C.

In some embodiments, the olefin may be a compound of formula: $H_2C=CHR^1$, where $R^1$ may be a substituted or unsubstituted alkyl, silyl, or siloxyl group. In various embodiments, $R^1$ may be a group of formula $—(CH_2)_nX$, where X is CN, F, Cl, Br, I, $—SiR^5_3$, $—OSiR^5_3$, $—O(O)COalkyl$, $—O(O)COalkenyl$,

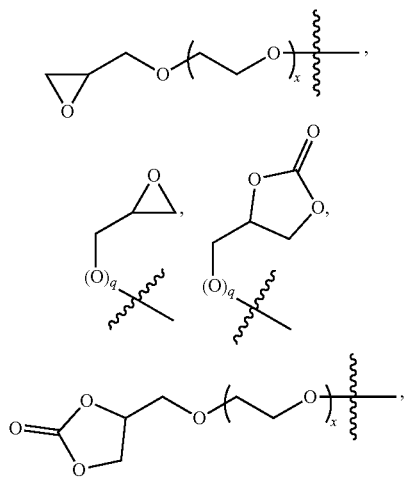

cycloalkyl, heterocyclyl, or

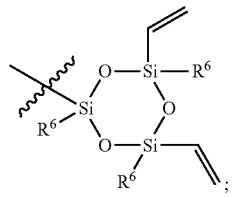

each $R^5$ may individually be alkyl, or —Oalkyl; each $R^6$ is individually alkyl; x is 1-10; n' is 1 to 50; and q is 0 or 1. In some embodiments, n' may be from 1 to 6. In some embodiments, X may be F, —O(O)COalkyl, —O(O)COalkenyl,

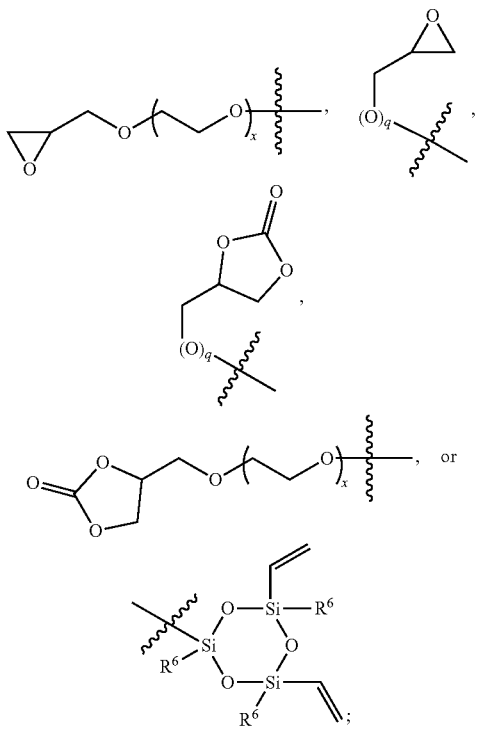

each $R^6$ is individually alkyl; x is 1-10; and q is 0 or 1. In some embodiments, $R^6$ may be methyl or ethyl. In various embodiments, $H_2C$=$CHR^1$, may be $H_2C$=$CHCH_2CN$, $H_2C$=$CHCH_2F$, $H_2C$=$CHCH_2Cl$, $H_2C$=$CHCH_2Br$, $H_2C$=$CHCH_2O(CH_2CH_2O)_xCH_3$, $H_2C$=$CHCH_2O$ $(CH_2CH_2O)_xCH_3$, $H_2C$=$CHCH_2O(CH_2CH_2O)_x\overline{CHCH_2O}$,

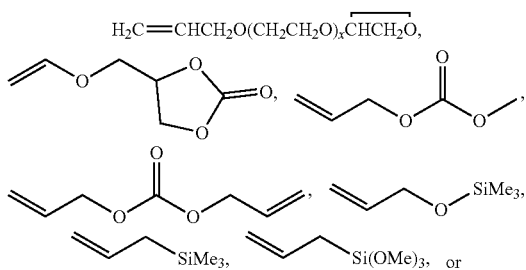

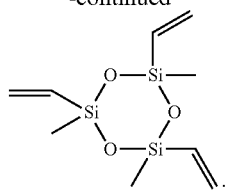

In some embodiments, the process is conducted at a temperature and for a time period sufficient to effect the reaction between a silicon hydride moiety on the silicon nanoparticle and the olefin to bind the olefin to the surface of the SiNP. In some embodiments, the temperature is from about 45° C. to about 65° C. In some embodiments, the time is from 1 hour to about 48 hours.

As further explanation of the process, in some embodiments, a Pt-catalyzed hydrosilylation reaction between an allyl-(ethylene oxide)$_n$-epoxy precursor and a silicon hydride (*SiH$_x$, where *Si denotes a surface Si atom) group on the surface of SiNPs prepared by the nonthermal plasma method, is described. The nonthermal plasma-prepared SiNPs feature clean, hydride-terminated services that are mostly free of surface oxide. Thus, it is possible to study the effects of different surface chemistries on silicon surfaces rather than a convolution of surface functional groups and oxide surfaces typical of conventional commercially supplied materials. The specifically designed artificial solid electrolyte interphase (SEI) may provide to the anode: (1) an organic-rich chemical composition with high flexibility to accommodate the volume change of the Si particles during cycling, (2) reinforcement in SEI resilience by formation of a new component via an epoxy reduction reaction, (3) enhanced electrode integrity due to 3-D network formation of the epoxy with the polymer binder, and (4) facilitated Li$^+$ transfer at the Si/electrolyte interphase due to the strong solvation of the oligo(ethylene oxide [EO]) moiety. Surface functionalized SiNPs (SF-SiNPs) are evaluated herein as an active anode material for lithium ion batteries. Compared with the baseline anode with H-terminated SiNPs (H-SiNPs), the SF-SiNPs exhibit significantly improved electrochemical performance, including first-cycle Coulombic efficiency (CE), capacity retention, and charge transfer resistance. Furthermore, capacity retention ability of the SF-SiNPs has been found to be closely related to the grafting density of the functional groups. Without being bound by theory, we believe that that these improved electrochemical properties result in better homogeneity of the electrode structure provided by the oligo(ethylene oxide) epoxide surface functionalities and their ability to interact and chemically bind to the polymer.

The present invention, thus generally described, will be understood more readily by reference to the following examples, which are provided by way of illustration and are not intended to be limiting of the present invention.

EXAMPLES

Example 1. Synthesis of carbonate functionalized silicon nanoparticles (SiNPs). Scheme 1 illustrates a synthetic procedure for forming an ethylene carbonate functionalized SiNPs (EC-Si). Commercial SiNPs with a vendor-claimed size of less than 50 nm (Alfa Aesar) were treated with hydrofluoric acid (1F) solution to form a hydride-terminated SiNP surface (i.e. etched SiNPs). Then, an ethylene carbonate moiety was grafted onto the surface of the H-SiNPs by reaction of the etched SiNPs with 4-((allyloxy)methyl)-1,3-dioxolan-2-one in the presence of a Pt-catalyzed hydrosilylation reaction in an argon-filled glovebox at 45° C. for 24 hours. After centrifugation, the particles are harvested with an average yield of about 80%.

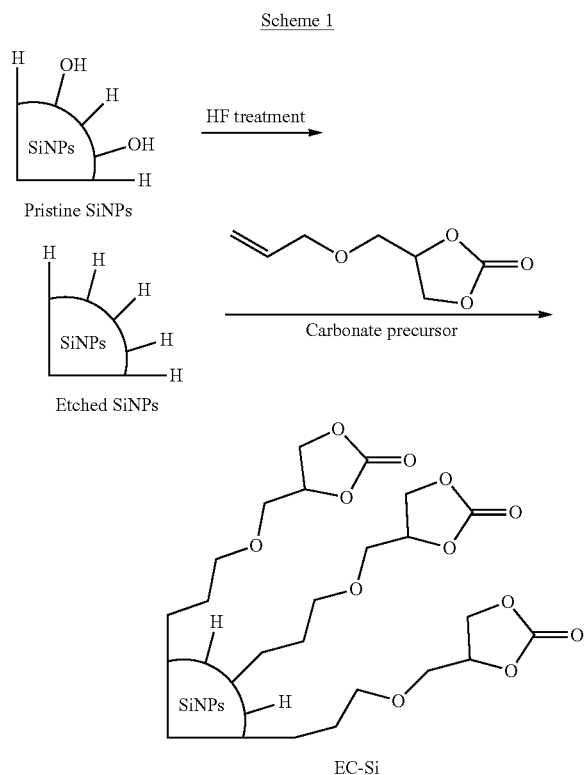

Scheme 1

Figure 1B:
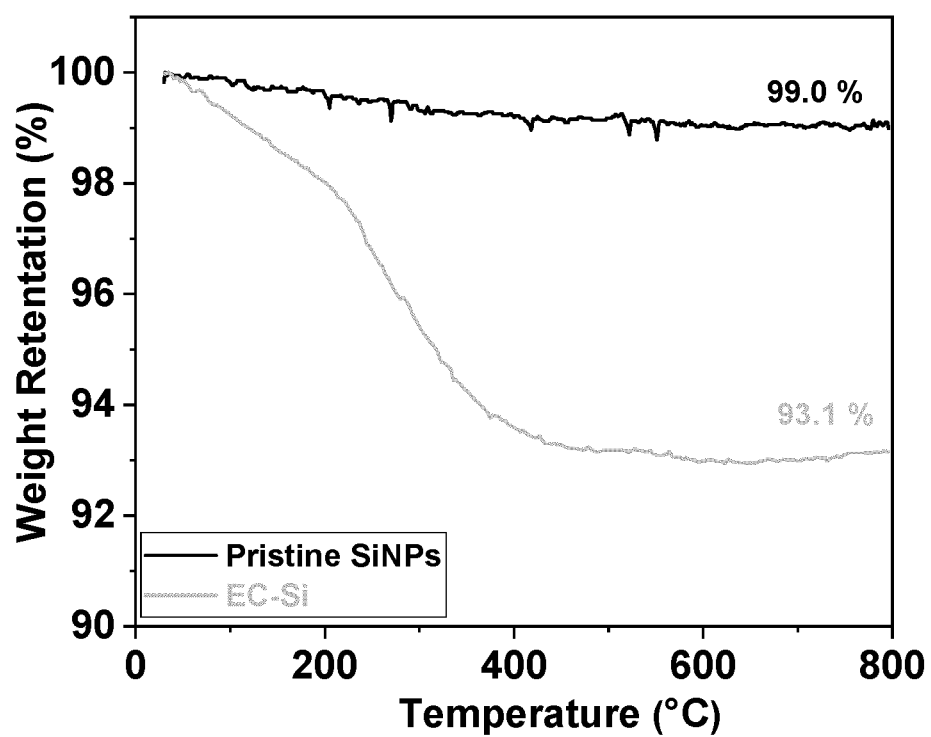

Example 2. FIG. 1 illustrates a Fourier transform infrared ("FTIR;" FIG. 1A) spectra and thermogravimetric analysis ("TGA;" FIG. 1B) thermograms of SiNPs before and after surface functionalization according to Example 1. A characteristic carbonyl stretch is exhibited at about 1725 wavenumbers in the FTIR, indicating successful carbonate functionalization of the SiNPs. Using TGA data and particle size, the grafting density of the SF-SiNPs was determined to be about 3.9 chains/nm$^2$.

Example 3. To prepare silicon anode laminations, Si nanoparticles (70 wt %), Timcal C45 (a commercial grade carbon black material) (2 wt %) and PAA (polyacrylic acid) binder (10 wt %) were thoroughly mixed in water. The resulting slurry was then cast onto a 50 m laminate with doctor blade on a copper current collector, which was dried under vacuum at 80° C. overnight. The cured electrode was punched into disks of 1.6 cm$^2$ with a loading of about 1.0 mg/cm$^2$ and further dried at 130° C. in vacuo. The electrode was evaluated using 2032 coin cells, Li metal counter electrode, Celgard 2325 separator, and 1.2 M LiPF$_6$ in EC/EMC (3:7) (EC is ethylene carbonate; EMC is ethylmethylcarbonate) electrolyte (i.e. "GEN2 electrolyte") with 10 wt % FEC.

Figure 2A:
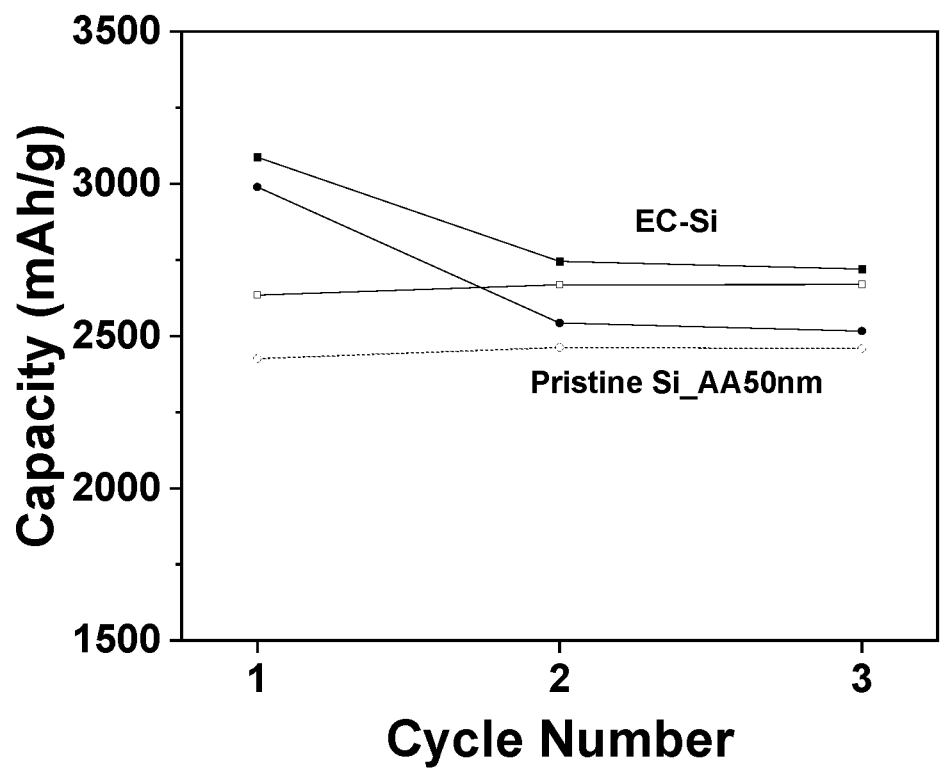
FIG. 2A is an FT-IR spectra, and FIG. 2B a trace from thermogravimetric analysis (TGA) of SiNPs and SF-SiNPs, according to the examples.
Figure 2B:
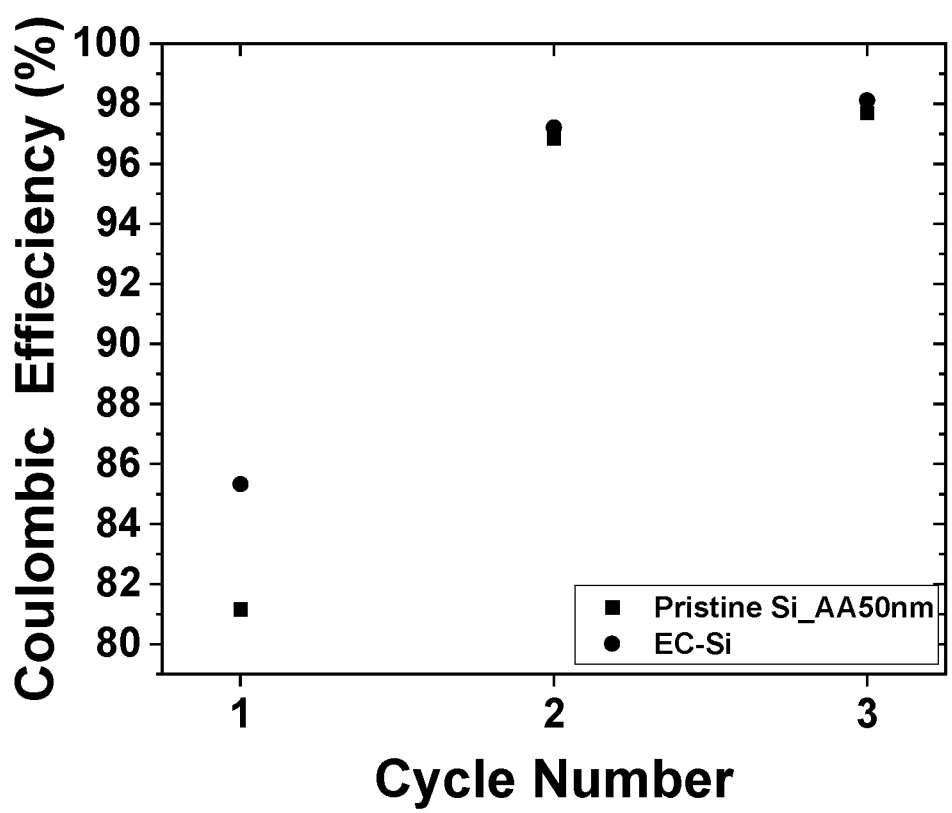

FIGS. 2A and 2B are graphs of three formation cycles of half cells fabricated using a silicon anode based on pristine and surface functionalized SiNPs (Example 1). Three charge-discharge formation cycles were performed from 0.01 V to 1.5 V at a C/20 rate. The EC-Si cell shows better cycling performance than the pristine sample in terms of initial capacity and initial Columbic efficiency.

Figures 3A, 3B:
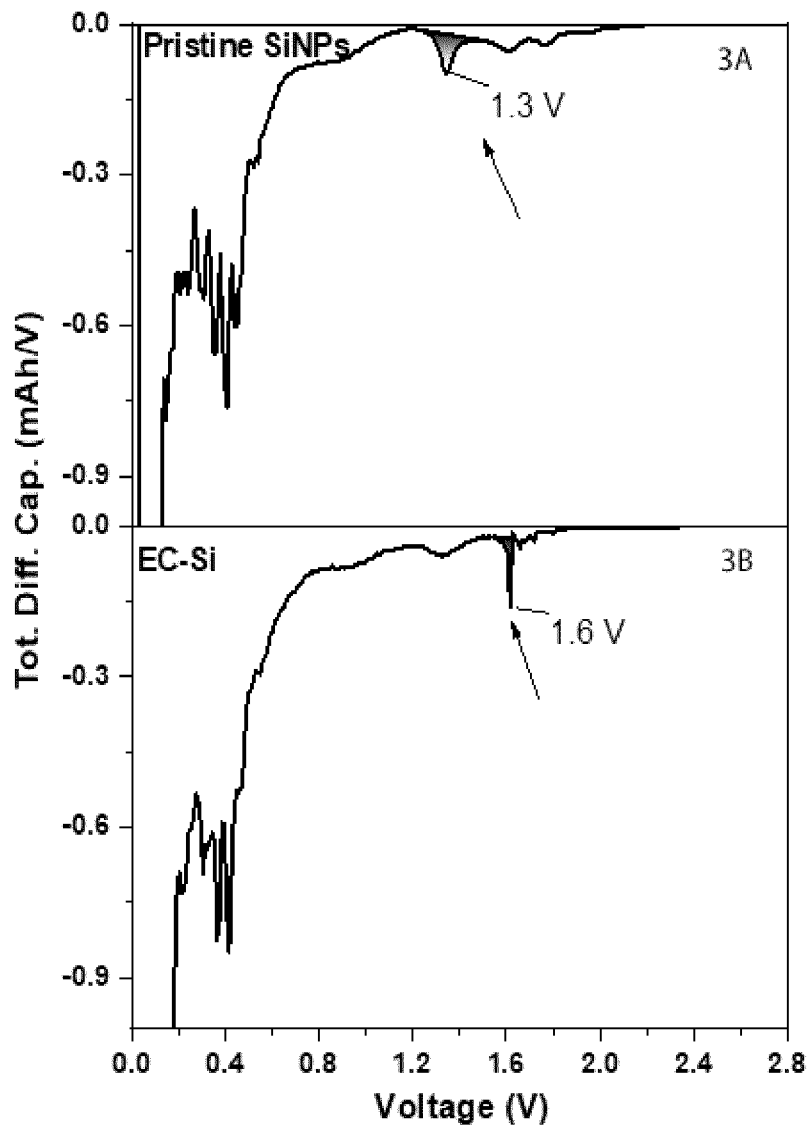
FIG. 3A is a graph of specific capacity.
FIG. 3B is a graph of Coulombic efficiency for half-cells using Si anode based on pristine and SF-SiNPs during formation cycles, according to the examples.

FIGS. 3A and 3B illustrate the differential capacity profiles of the half cells during three formation cycles. The small peak at about −1.6 V in FIG. 3B is attributed to the formation of a protection layer on the anode surface as a possible result of decomposition of the surface EC group.

Figure 4:
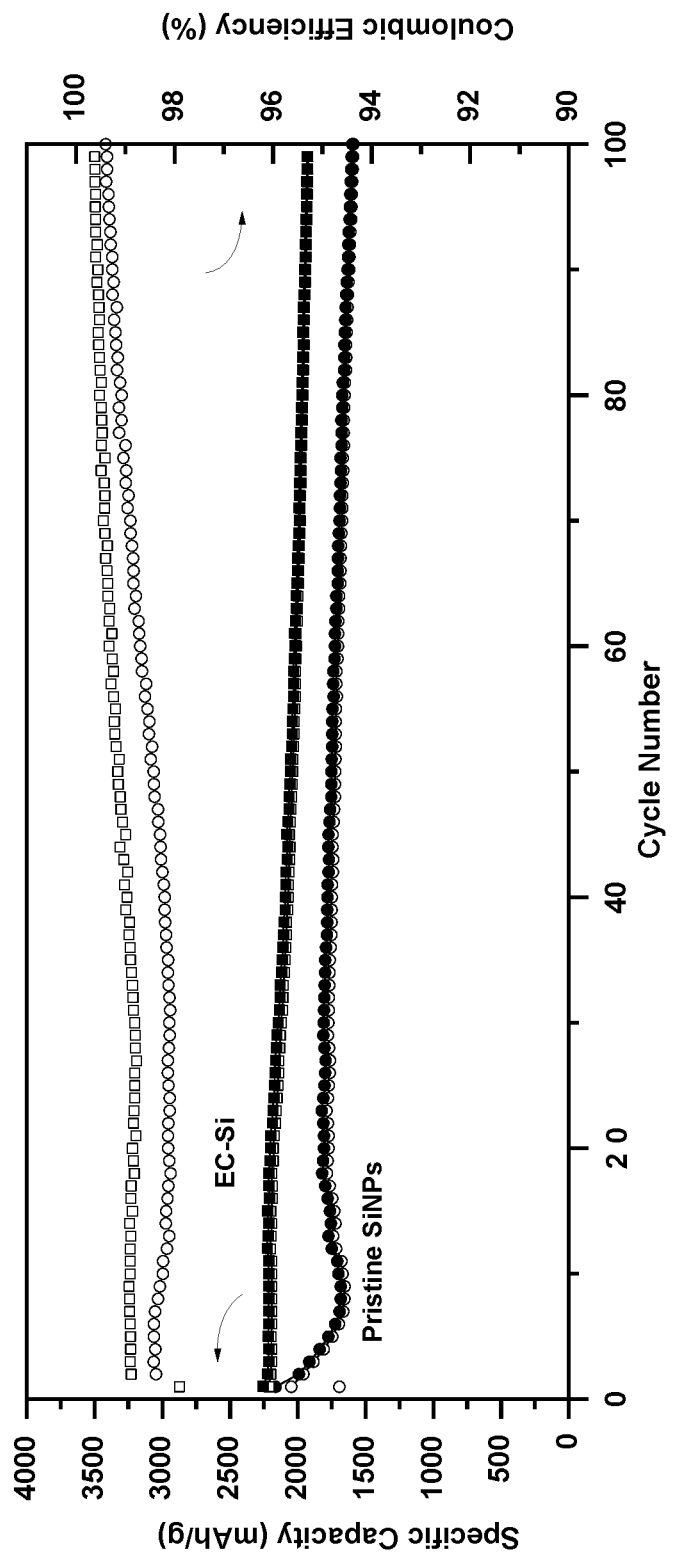
FIG. 4 is a dual graph of specific capacity (mAh/g) for a Li/SiNPs and Coulombic efficiency (%) for a Li/SF-SiNPs anode during formation cycle, according to the examples.

FIG. 4 illustrates the specific capacity retention and the Coulombic efficiency profiles of half cells. The half cells were subjected to 100 cycles at a C/3 rate. The cut-off voltage was from 0.01 V to 1.5 V. It was observed that the EC-Si cell (Example 1) delivered significantly different cycling performance compared with the cell based upon pristine SiNPs. The carbonate functional SiNP cells showed stable capacity especially during the first 20 cycles and higher initial specific capacity (2364 mAh/g). The improvement may be assigned to the ability of surface carbonate group forming resilient protection layer. Table 1 summarizes the initial capacity and Coulombic efficiency results of the silicon anodes based on pristine and SF-SiNPs.

TABLE 1

Initial Capacity and Coulombic Efficiency results.

| Sample | Si-AA50 nm | EC-Si |
|---|---|---|
| Grafting Density | N/A | 3.9 |
| Initial Capacity (mAh/g)-FM | 2426/2989 | 2634/3087 |
| 1$^{st}$ CE (%) | 81.2 | 85.3 |
| Initial Capacity (mAh/g)-CY | 2047/2162 | 2364/2412 |

[Please explain the grafting density number. How many groups/what?]

Example 4. In this example, a Pt-catalyzed hydrosilylation reaction between an allyl-(ethylene oxide)$_n$-epoxy precursor and a silicon hydride (*SiH$_x$, where *Si denotes a surface Si atom) group on the surface of SiNPs prepared by the nonthermal plasma method, is described. Allyl-(EO)$_n$-epoxy precursors (synthesized according to Scheme 2) were grafted onto the surface of the H-SiNPs by a Pt-catalyzed hydrosilylation reaction (Scheme 3) in an argon-filled glovebox at 45° C. for 24 h. After centrifugation, the particles are harvested with an average yield of 80%.

Scheme 2

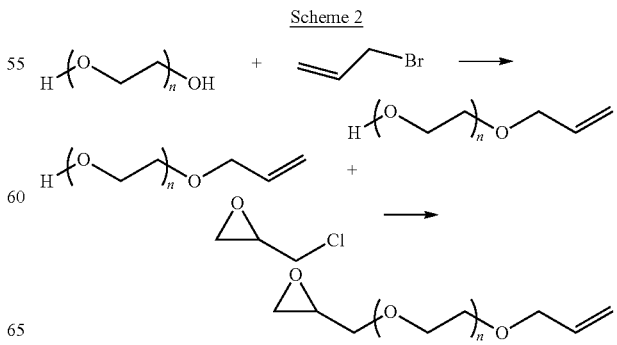

Scheme 3

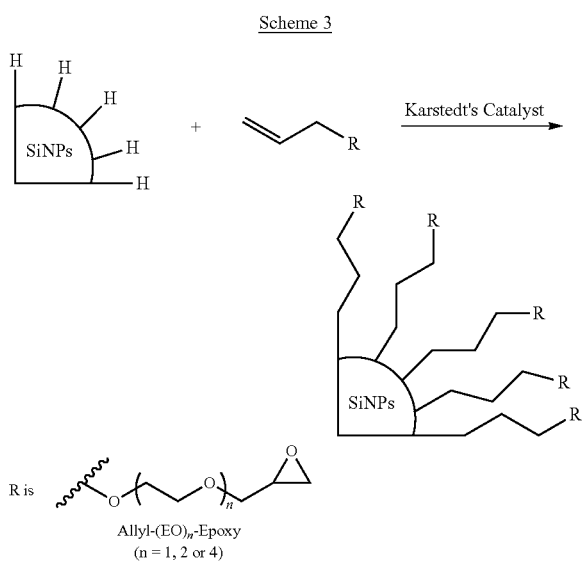

Allyl-(EO)$_n$-Epoxy
(n = 1, 2 or 4)

Figure 5:
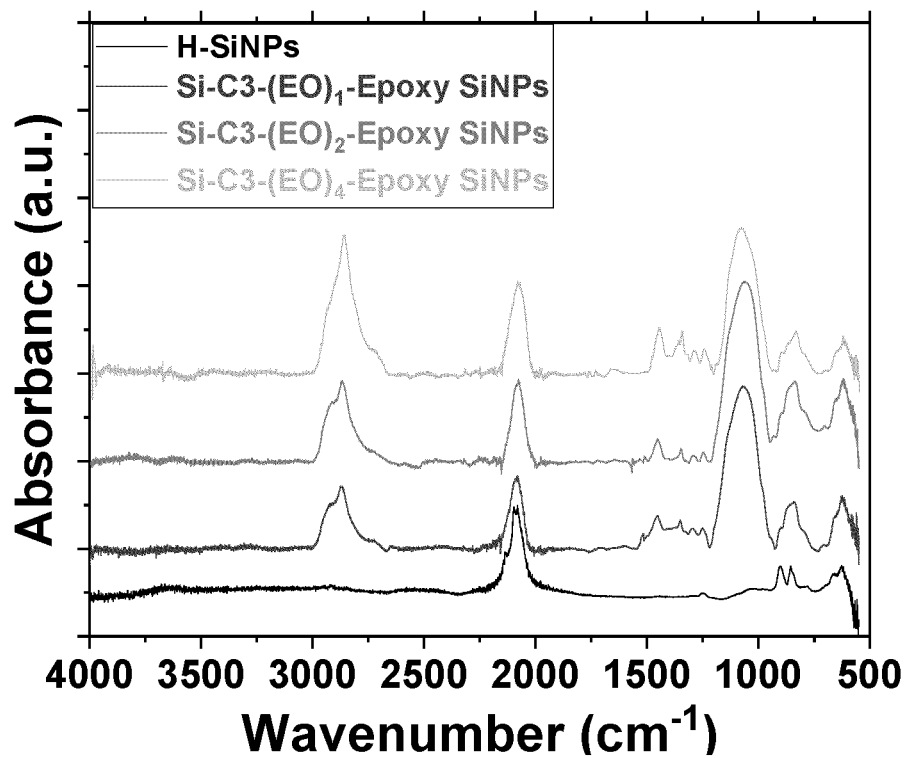
FIG. 5 exhibits FTIR spectra for pristine SiNPs, and various C3-$(EO)_n$-epoxy functional SiNP (n=1, 2, and 4), according to the examples.

To maximize the grafting density of the functional groups, a five-fold (by weight) excess of allyl-(EO)$_n$-epoxy/H-SiNPs was used and the unreacted precursors were removed by high-speed centrifugation. Fourier transform infrared (FT-IR) spectra were obtained for H-SiNPs (i.e. "Pristine SiNPs) and epoxy-functionalized SiNPs. See FIG. 5. Strong and broad peaks centered at 2100 cm$^{-1}$ were observed and are believed to originate from the Si—H stretching vibrations (2087 cm$^{-1}$ for *SiH, 2108 cm$^{-1}$ for *SiH$_2$, and 2138 cm$^{-1}$ for *SiH$_3$), with Si—H deformation modes being observed at 850-900 cm$^{-1}$. A minor peak at 1100 cm$^{-1}$ was observed for the Si—O—Si, indicating the H-terminated SiNPs contains a very low amount of SiO$_x$. After hydrosilylation, all of the SF-SiNPs showed new IR peaks illustrating successful surface functionalization. The strong C—H vibrational peaks of alkyl at 2880 and 2930 cm$^{-1}$, C—O bond at around 1050 cm$^{-1}$, Si—C bond stretching at 1040 cm$^{-1}$ (overlapped with the C—O bands), and the epoxy ring breathing mode at 1250-1500 cm$^{-1}$ confirm the successful attachment of the precursor to a large, broad peak centered around 1100 cm$^{-1}$ from Si—O vibrations also indicates some non-selectivity in the surface functionalization reaction, with formation a silyl ether *Si—O—C possible via ring-opening of the epoxy group. Not all of the *SiH$_x$ groups were consumed due to the steric hindrance, especially for the bulky precursor allyl-(EO)$_4$-epoxy.

Figure 6A:
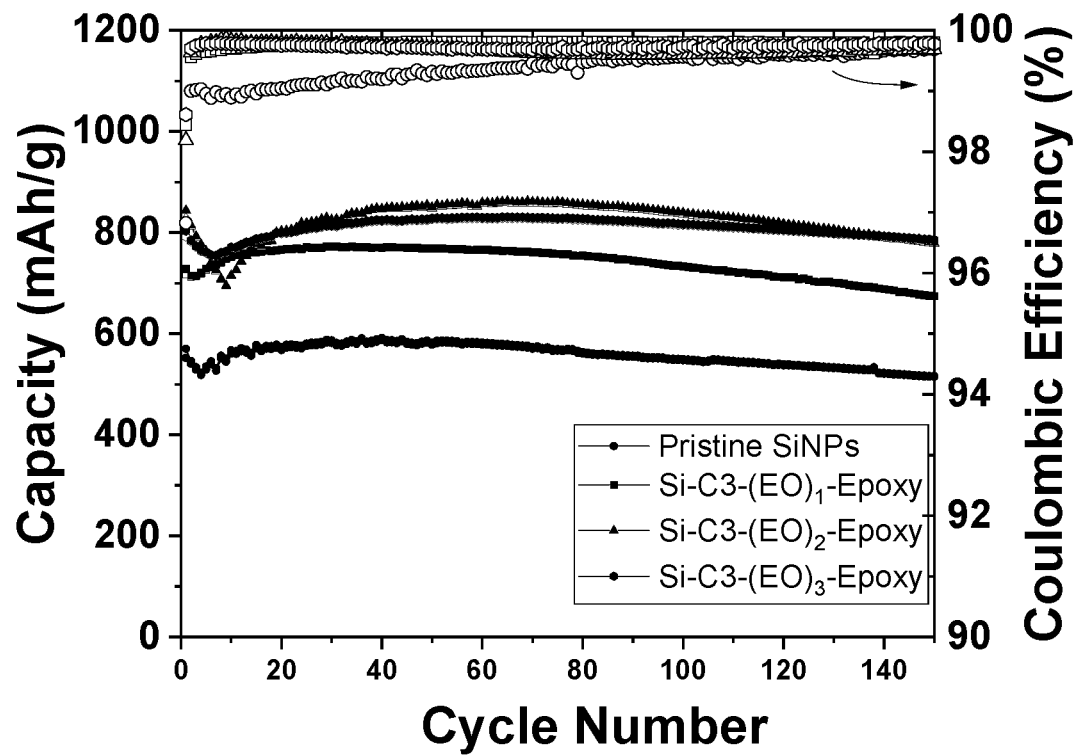
FIGS. 6A and 6B are graphs of electrochemical performance of Si composite electrodes, where 6A shows cycling performance and Coulombic efficiency, and 6B shows Nyquist plots of H-SiNP and SF-SiNP electrodes after 150 cycles, according to the examples.
Figure 6B:
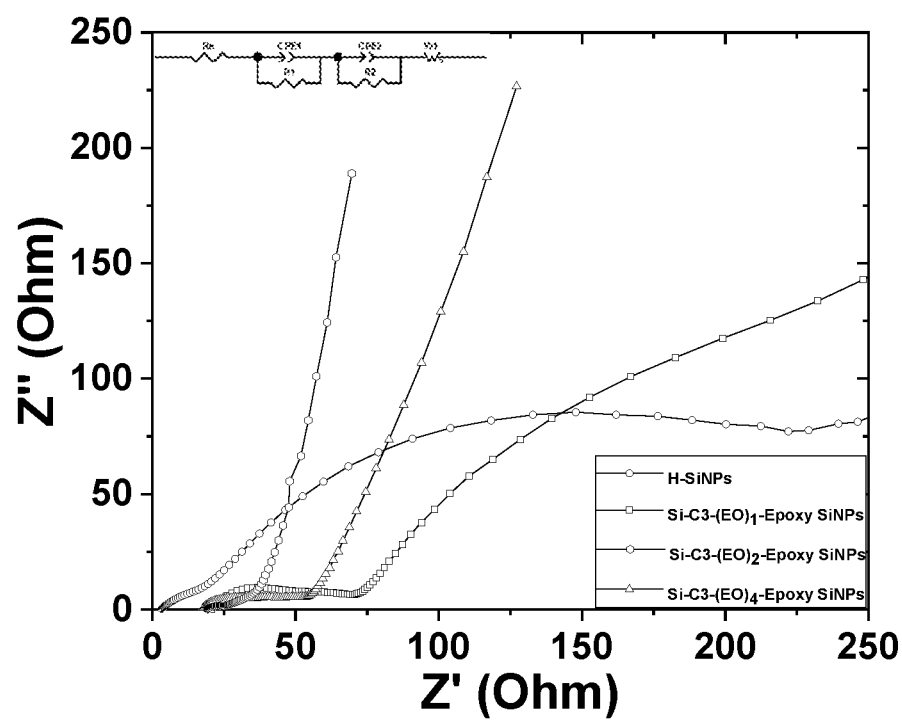
Figure 24A:
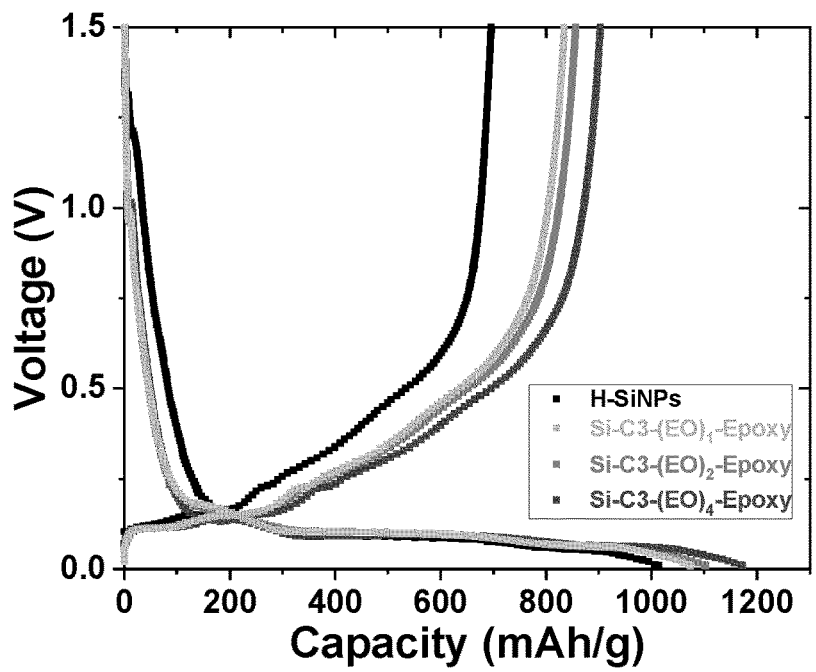
FIG. 24A is a charge/discharge voltage profile.
Figure 24B:
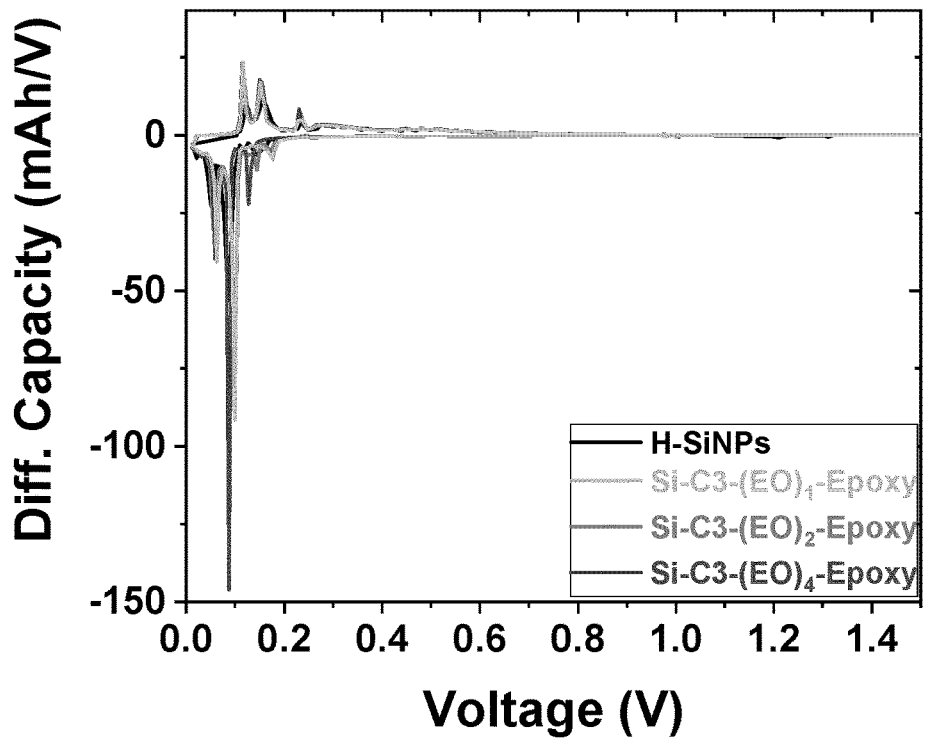
FIG. 24B is a differential capacity profiles (dQ/dV) for the $1^{st}$ C/20 formation cycle, according to Example 4.

SF-SiNP electrodes were first subjected to three C/20 formation cycles with a cutoff voltage of 0.01-1.5 V. The charge and discharge voltage profiles and differential capacity profiles (dQ/dV) for the 1$^{st}$ C/20 formation cycle are shown in FIGS. 24A and B. The 1$^{st}$ C/20 formation cycle Coulombic efficiency (CE) for the anode with H-SiNPs is only 68.6% and increased to 77.6%, 77.6%, and 77.0% for SF-SiNPs with EO repeating units of 1, 2, and 4, respectively. FIGS. 6A and 6B show the cycling performance of the SF-SiNP anode over 150 cycles. The electrode made with H-SiNPs shows an initial delithiation capacity of 552 mAh/g, which was much lower than the theoretical value of the composite electrode (900 mAh/g), indicating high lithium trapping/loss due to the chemical/electrochemical instability of the H-SiNPs. However, for all of the SF-SiNP anodes, higher initial capacities were achieved (Table 1). When switched from low-rate to C/3 cycling, the Coulombic efficiency of the Si-C3-(EO)$_n$-epoxy electrodes was stabilized at 99.8% in a few cycles, whereas the anode with H-SiNPs never reached 99.5% within 80 cycles. The introduction of surface functional groups mitigates the surface reactivity of the Si anode and enables much improved cycling performance.

TABLE 1

Summary of grafting density, loading density, initial capacity, Coulombic efficiency, capacity retention, and charge-transfer resistance (R$_{ct}$) of graphite/silicon composite electrodes fabricated using H-SiNPs or SF-SiNPs.

| Anode | Grafting density (chains/nm$^2$) | Loading density (mg/cm$^2$) | Initial capacity$^a$ (mAh/g) | Initial Coulombic efficiency$^a$ (%) | Capacity retention (%) | Charge transfer resistance R$_{ct}$$^b$ (Ω) |
|---|---|---|---|---|---|---|
| Si-H SiNPs | Not Applicable | 1.6 | 552 | 96.8 | 93.5 | R$_{ct,1}$: 7.3 R$_{ct,2}$: 178.1 |
| Si-(EO)$_1$-epoxy | 5.1 | 1.6 | 717 | 98.4 | 94.1 | R$_{ct,1}$: 19.0 R$_{ct,2}$: 20.3 |
| Si-(EO)$_2$-epoxy | 4.2 | 1.6 | 803 | 98.2 | 97.9 | R$_{ct,1}$: 3.2 R$_{ct,2}$: 5.6 |
| Si-(EO)$_4$-epoxy | 3.6 | 1.6 | 828 | 98.6 | 94.3 | R$_{ct,1}$: 24.4 R$_{ct,2}$: 10.6 |

$^a$1$^{st}$ C/3 delithiation capacity and Coulombic efficiency
$^b$EIS measured at the 150$^{th}$ cycle;
R$_{ct,1}$ and R$_{ct,2}$ are obtained from the high and intermediate frequency semi-circles.

The surface functional group on the SiNPs does change the interfacial property of the Si electrode. Electrochemical impedance spectroscopy (EIS) measurement was performed on the SiNP electrodes after 150 cycles by applying a 10 mV voltage to the cells in the frequency range between 1 MHz to 0.1 Hz. The impedance data were fit to a phenomenological equivalent circuit model consisting of two Randle circuits in series followed by a Warburg diffusion polarization. R$_{ct}$ reflects the kinetics of the charge transfer or interfacial impedance at the Si/electrolyte interface during the charge and discharge process. As shown by the R$_{ct}$ data in Table 1, the functionalized SiNPs showed a decreased R$_{ct,2}$ compared with that of the pristine SiNPs anode. R$_{ct,2}$ for the cycled Si-C3-(EO)$_2$-epoxy SiNP anode exhibited the lowest R$_{ct,2}$, indicating limited SEI accumulation/growth and good cycling stability. This least interfacial resistance is speculated from the combination of the grafting density and the ideal EO geometry, yielding a facile Li$^+$ coordination and facilitated ion transport at the electrode/electrolyte interphase. Another observation is the increase of the bulk resistance of the cycled electrodes with Si-C3-(EO)$_n$-epoxy SiNPs as active materials, indicating a new SEI formation involving the reduction of the surface functional groups.

Different weight loss from three Si-C3-(EO)$_n$-epoxy SiNPs was observed during hearing to 800° C., indicating that the grafting densities of the SF-SiNPs samples differ. To predict the grafting density, the following equation was used. See Hu et. al. *Langmuir* 2014, 30, 11212-11224; and Benoit et. al. *Anal. Chem.* 2012, 84, 9238-9245.

$$\frac{\left(\frac{wt_{FG}\%}{wt_{NP}\%}\right)\times\left(\rho_{NP}\frac{4}{3}\pi r_{NP}^3\right)}{M_W}\times N_A\times\frac{1}{4\pi r_{NP}^2}$$

where wt$_{FG}$% is the weight percentage of the functional group and wt$_{NP}$% is the weight percentage of the SiNPs (both values were obtained from TGA thermograms of the SF-SiNPs); $\rho_{NP}$ and $r_{NP}$ are the density and the radius of the SiNPs, respectively; M$_w$ is the molecular weight of the functional group; and N$_A$ is Avogadro's number (6.02×10$^{23}$). The grafting densities of the SF-SiNPs are summarized in Table 1. This calculation is based on the assumption that the surface functional groups are completely decomposed and vaporized when heated to 800° C. The maximal grafting density ("GD") of different functional groups depends on their molecular structure. The Si-C3-(EO)$_4$-epoxy SiNPs have the longest chain but the lowest GD of 3.6 chain/nm$^2$. This is probably due to the steric hindrance of the longer chain preventing the hydrosilylation reaction. The shorter allyl-(EO)$_1$-epoxy has the highest GD of 5.1 chain/nm$^2$. By lowering the feed ratio of the allyl-(EO)$_1$-epoxy to the Si—H SiNPs, a lower GD (2.2 chain/nm$^2$) for the SiNPs was prepared.

Figure 7:
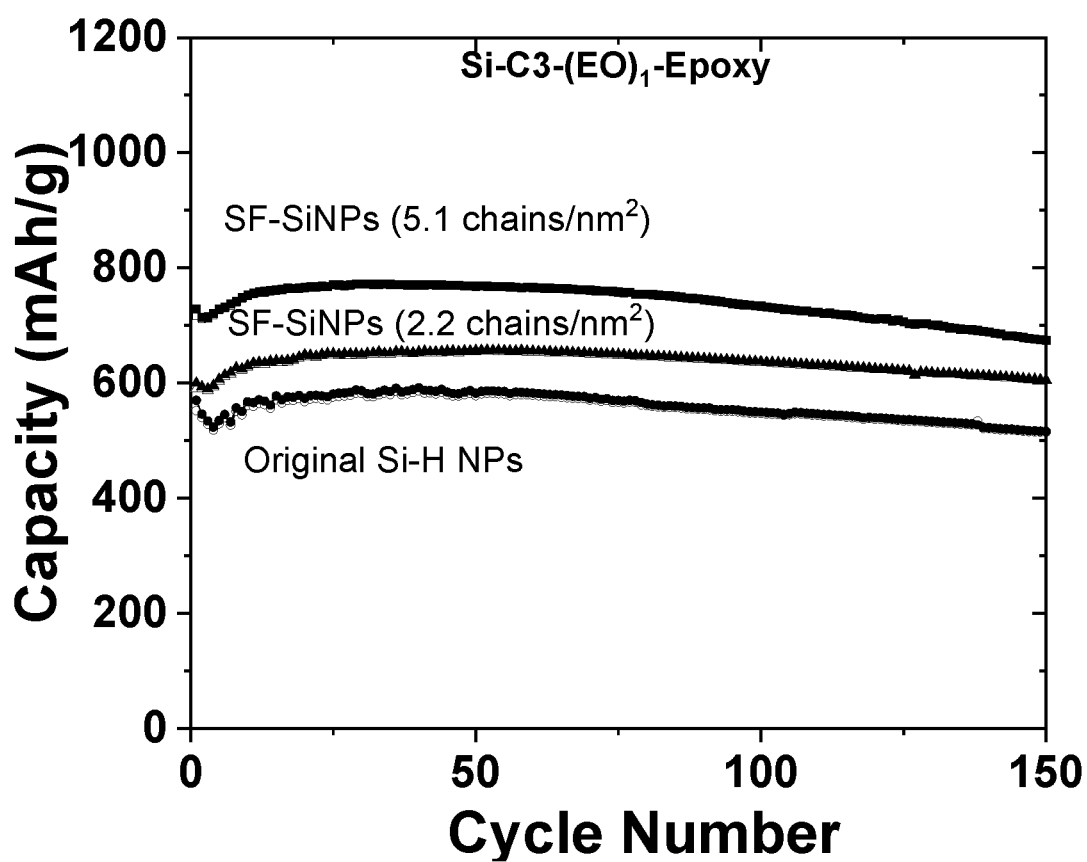
FIG. 7 is a graph of specific capacity (lithiation: solid sphere; delithiation: empty sphere) for Si-C3-$(EO)_1$-epoxy SiNPs with grafting densities of 2.2 and 5.1 chain/$nm^2$ over 150 cycle with C/3 rate, according to the examples.
Figure 8:
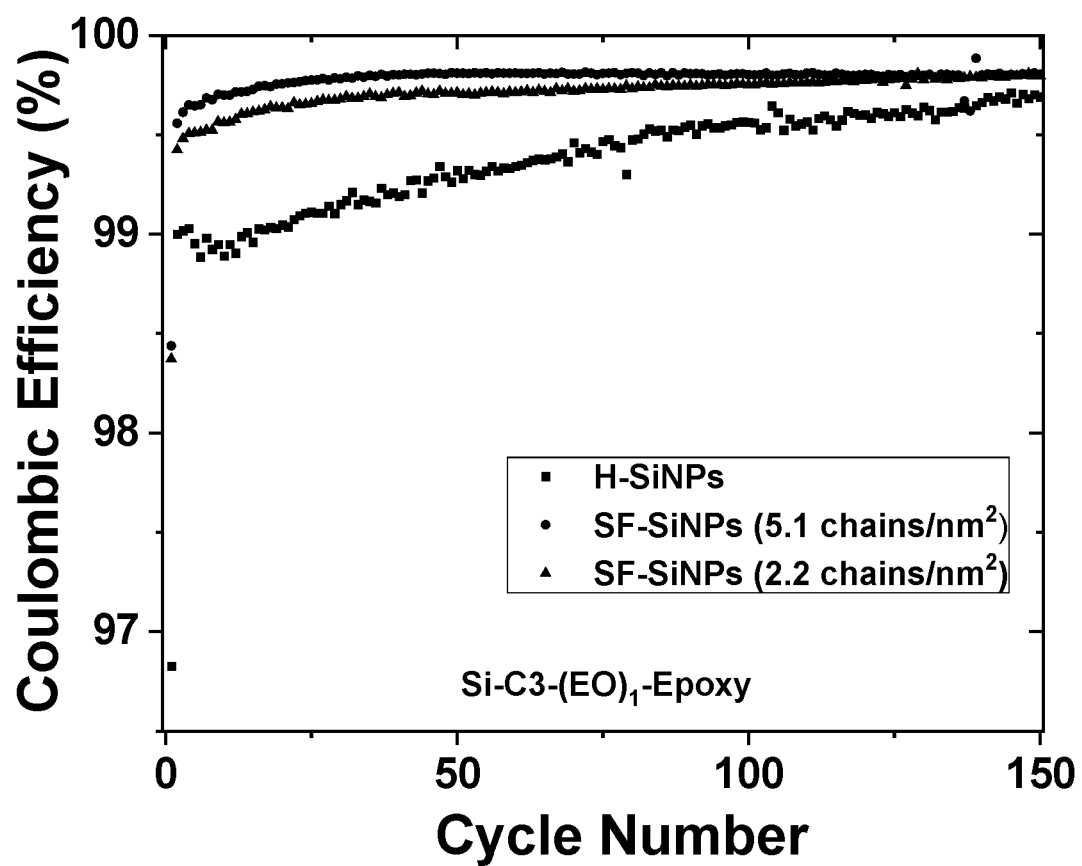
FIG. 8 is a graph of Coulombic efficiency for Si-C3-(EO)$_1$-epoxy SiNPs with grafting densities of 2.2 and 5.1 chain/$nm^2$ over 150 cycle with C/3 rate, according to the examples.

FIG. 7 is a summary of the capacity retention and FIG. 8 is a graph of the Coulombic efficiency for the above samples. While both two electrodes have better electrochemical performance than the H-SiNPs electrode, the comparison also illustrates that the higher the GD, the higher the capacity retention and Coulombic efficiency. This comparison clearly indicates that the more surface coverage of the SiNPs, the higher utilization of the active materials and the less surface reactivity, leading to improved electrode integrity.

Example 5. Surface functionalization may promote the particle distribution in the Si/graphite composite electrode by the strong interaction of SF-SiNPs and the polymer binder. Ring opening reactions of the epoxy group with the carboxylic acid group of PAA (polyacrylic acid) forms a covalent bond, thus significantly improving the electrode integrity through the adhesion of SiNPs with the binder and current collector. Scheme 4 is a drawing of the resulting PAA-functionalized-SiNPs:

Scheme 4

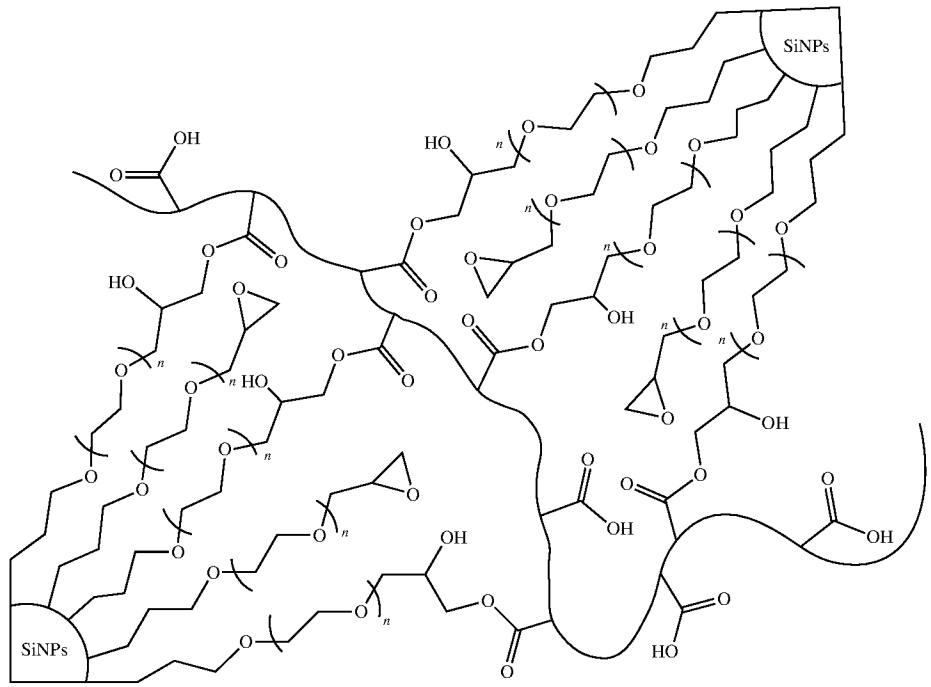

Example 6. Scanning electron microscopy (SEM) and energy-dispersive X-ray (EDX) spectrosocy were employed to study the morphology change of the Si/graphite composite anodes before cycling. SEM images (not shown) of the anodes with H-SiNPs show large particle agglomeration before cycling and after cycling, whereas the surface functionalized SF-SiNPs are well distributed within the matrix of the graphite active material before cycling, and the same electrode morphology was retained even after 150 cycles. This morphological difference explains the high utilization of the Si material in the composite anode reflected by the higher initial capacity of the SF-SiNPs. Furthermore, the as-prepared SiNPs exhibited a higher amount of F-rich decomposition products on the surface of the electrode, compared with the SF-SiNP anode, indicating that surface functionalization could mitigate the parasitic reactions with the electrolyte during repeated cycling. This result is also consistent with the results of the electrochemical analysis.

Figure 9:
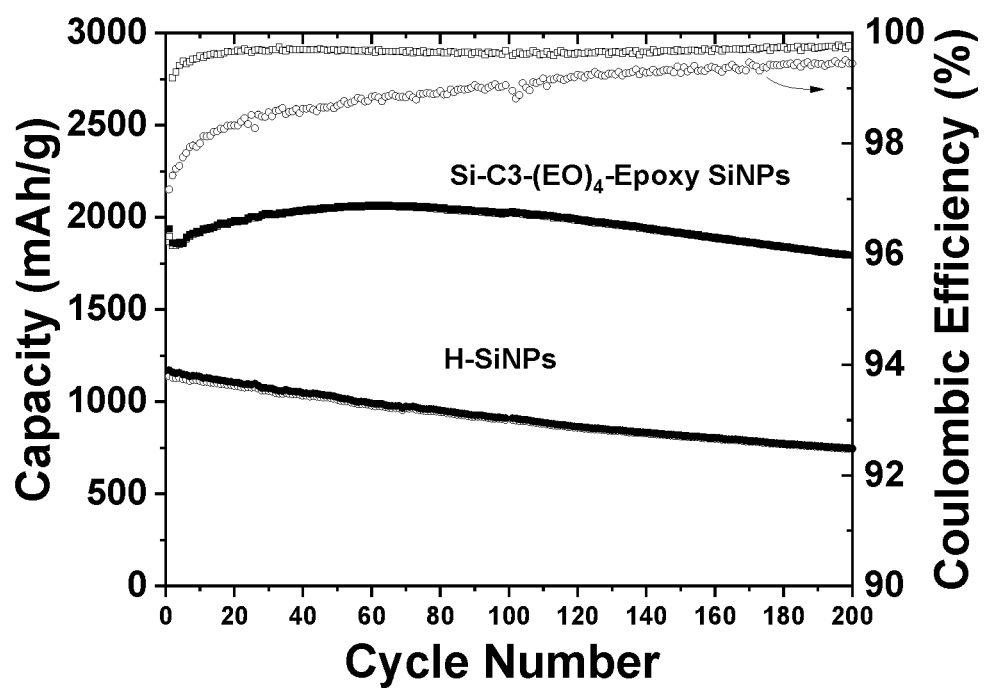
FIG. 9 is a graph of capacity retention and Coulombic efficiency for pure silicon anodes using H-SiNPs and Si-C3-$(EO)_4$-epoxy SiNPs as active material, according to the examples.
Figure 10:
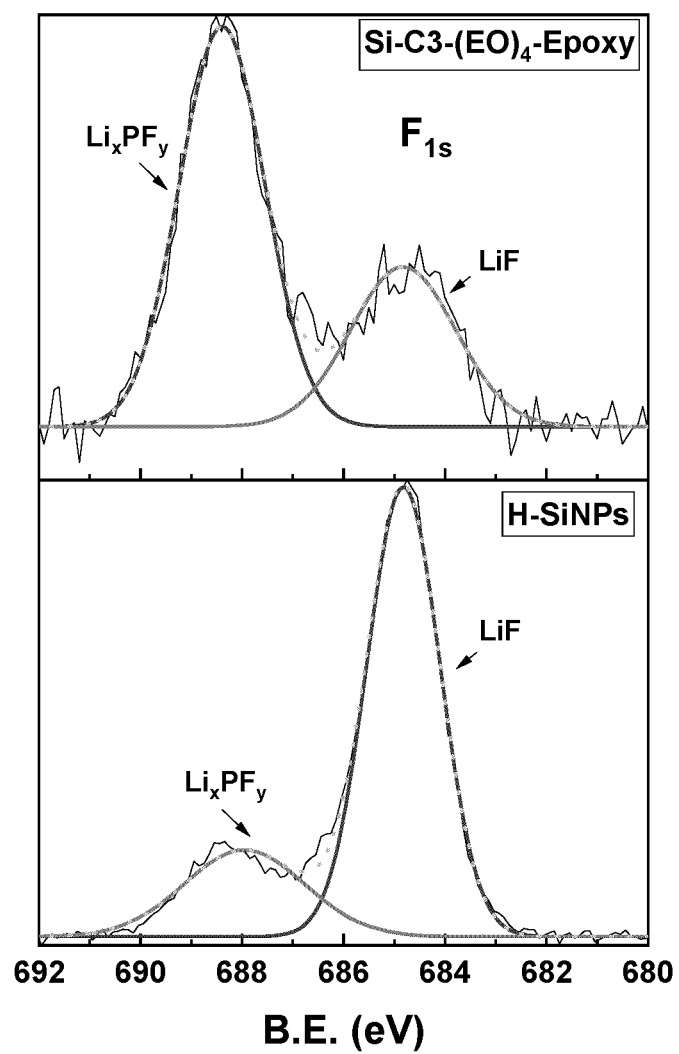
FIG. 10 is an XPS spectra of H-SiNPs and Si-C3-$(EO)_4$-epoxy-SiNPs anodes after 200 cycles at delithiated stage.

To verify the effectiveness of the surface functionalization, the electrochemical performance of an Si anode having only the surface functionalized-SiNPs as an active material was tested. FIG. 9 shows an Si-C3-(EO)$_4$-epoxy anode exhibiting a higher initial delithiation capacity of 1868 mAh/g (39% increase over the pristine anode) and 96% capacity retention for 200 cycles (65% for the pristine anode). Although it is difficult to analyze the chemical composition of the SEI, it is clear that the high reactivity of the pristine SiNPs was suppressed after surface functionalization as evidenced by FIG. 10. C1s XPS data didn't show big difference (data not shown) for both electrodes, however, much less concentration of LiF was clearly detected from the F1s XPS spectra for the SF-SiNPs.

In summary, surface functionalized SiNPs were synthesized via a Pt-catalyzed hydrosilylation reaction between H-terminated SiNPs and the allyl-(EO)n-epoxy precursor. The introduction of an organic monolayer on the surface of silicon particles prevents the agglomeration of the nano-sized silicon particles, thus improving the utilization of the active silicon material in the composite anode and its chemical reactivity. Furthermore, the surface layer mitigates the parasitic reactions of the Li$_x$Si with electrolyte and enables the reversible insertion and extraction of lithium with much improved initial capacity and capacity retention compared with the anode prepared with H-terminated Si particles.

Example 7. Scheme 5 illustrates the synthetic procedures of an artificial SEI SiNPs (A-SEI-functionalized SiNPs (AF-SiNPs)).

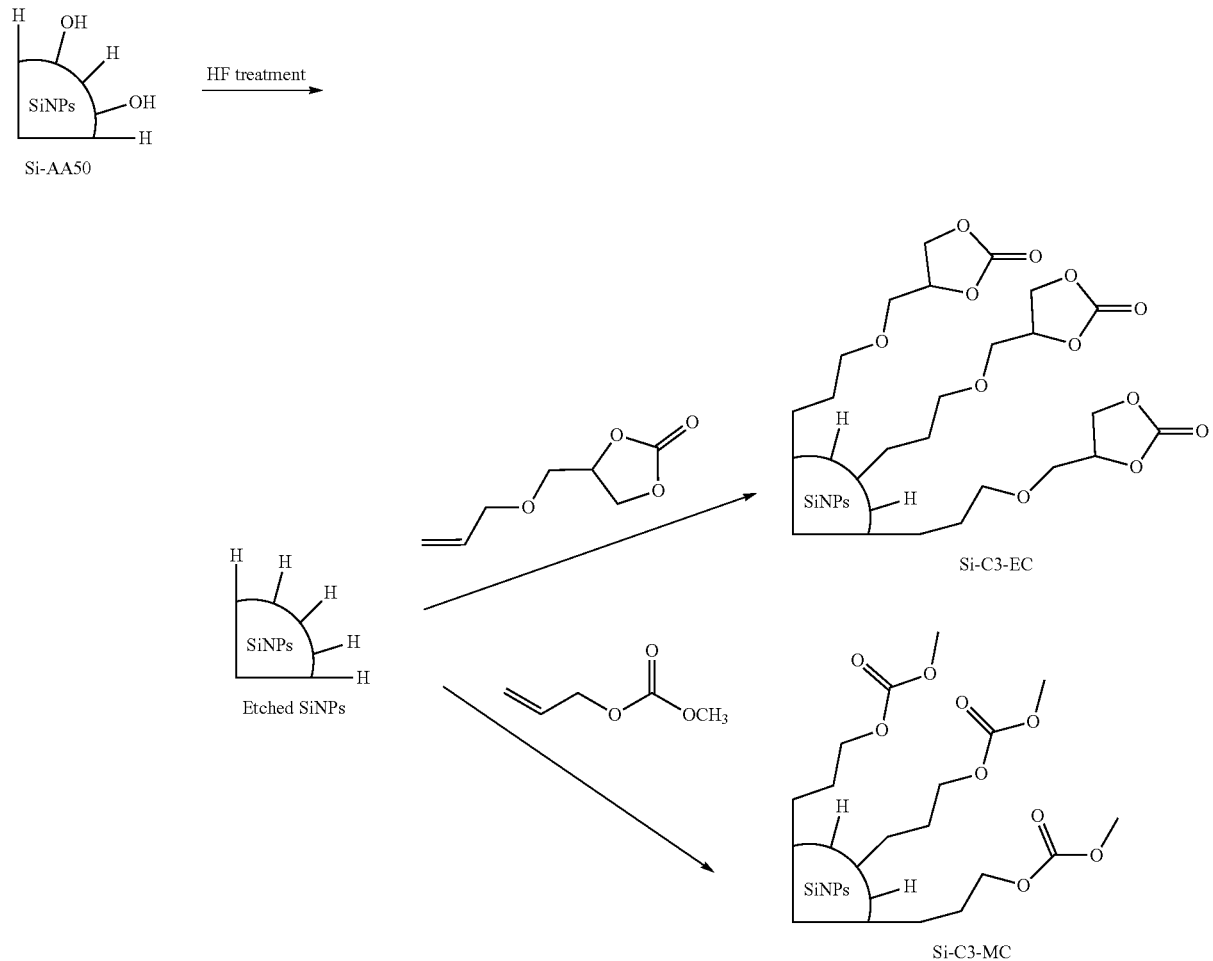

Scheme 5

The surface of pristine SiNPs is covered by a native layer of SiOx and Si—H (black curve) was treated with HF to enrich surface Si—H group. After HF treatment, several changes were observed when comparing pristine SiNPs, HF treated SiNPs, and SiNPs functionalized with carbonates, such as above in Scheme 4. Through FTIR, not shown, it was observed that the intensity of the Si—H peak (about 2100 cm$^{-1}$) increased when comparing the pristine to the treated SiNPs and the intensity of the O—SiH peak (a broad peak around 3200-3600 cm$^{-1}$) decreased when comparing the pristine to the treated SiNPs.

Figure 11:
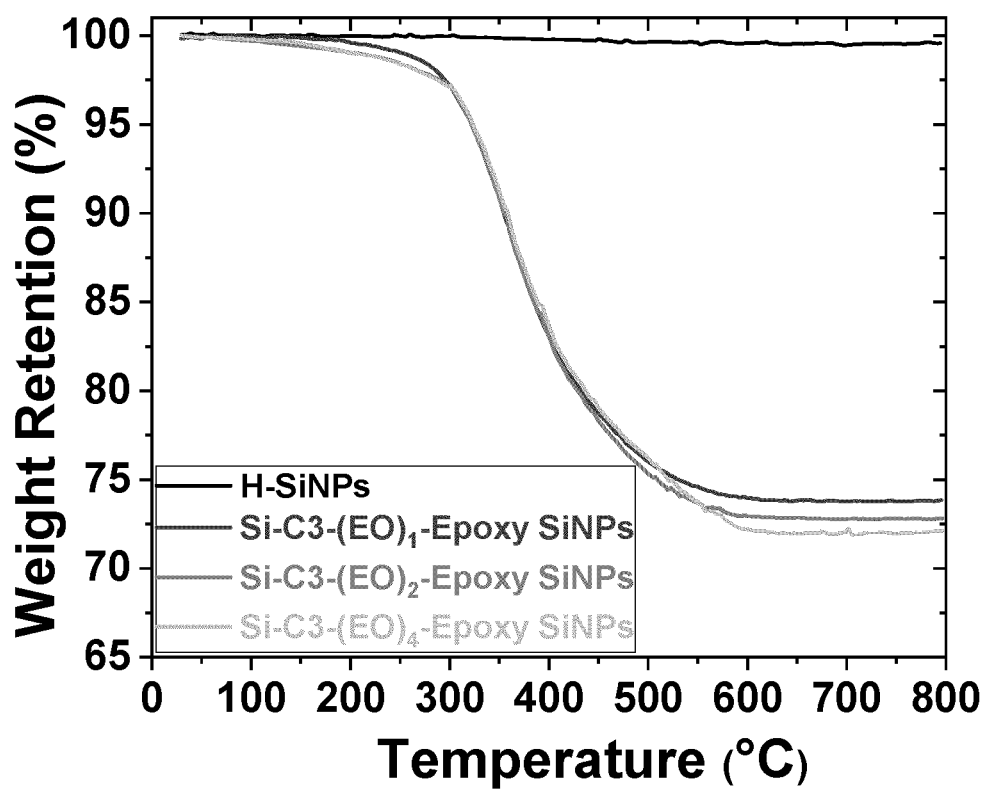
FIG. 11 shows TGA thermograms for pristine SiNPs and the functionalized SiNPs from Example 1.

A hydrosilylation reaction was employed to attach designed SEI-layer on the particle surface. Taking an EC functional group as an example, the successful functionalization was confirmed by the change on the Si NP surface as indicated by both FTIR analysis and XPS data. For example, on the FTIR, a C—H peak was observed at about 2900-3000 cm$^{-1}$ in the functionalized SiNPs, compared to either the pristine or treated SiNPs. Using TGA data and particle size, the grafting density of the ASEI-functionalized SiNPs (AF- SiNPs) was determined to be about 3.9 chains/nm$^2$. See FIG. 11. TEM micrographs (not shown) of AF-SiNPs reveal that an amorphous coating is formed on particle surface while the crystallinity of the bulk particles is preserved.

Figure 12:
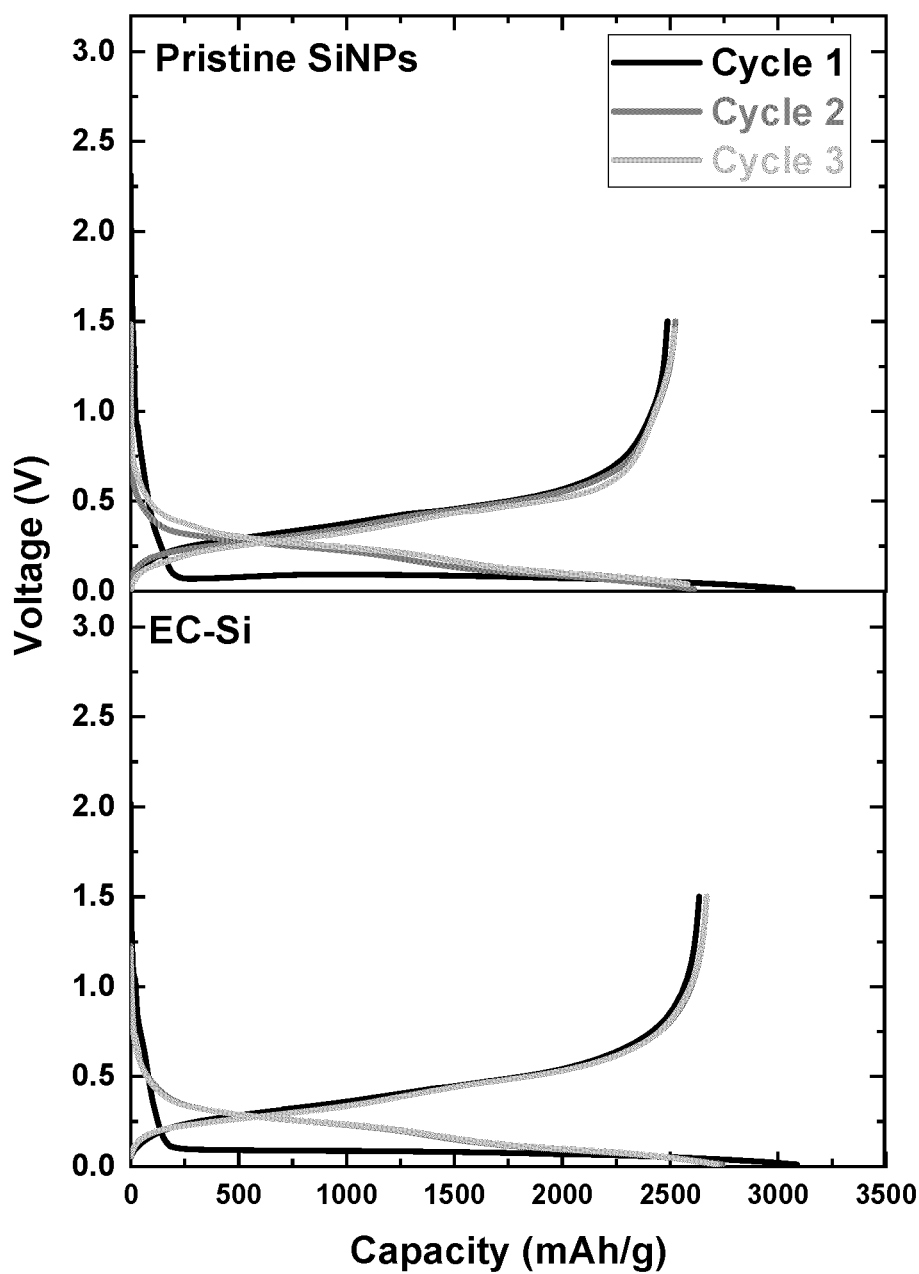
FIG. 12 is a graph of voltage profiles of 3 C/20 formation cycles for cells based on SiNPs with artificial SEI, according to the examples.
Figure 13:
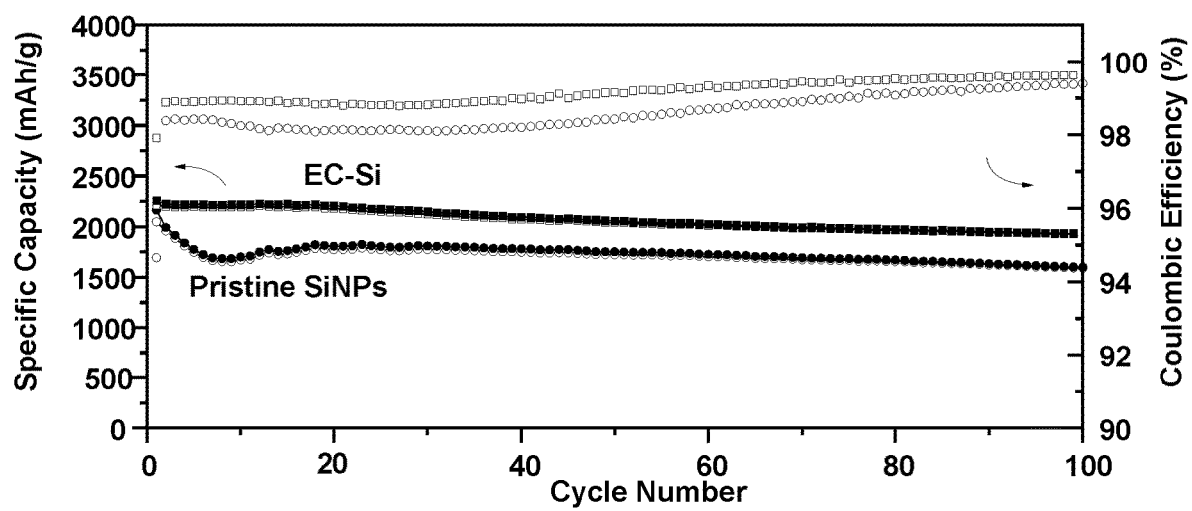
FIG. 13 is a graph of capacity retention and Coulombic efficiency of the following 100 C/3 cycles of Li/Si half-cell for cells based on SiNPs with artificial SEI, according to the examples.

To evaluate the stabilization effect of A-SEI groups, Li/Si half cells were prepared. Three charge-discharge formation cycles were performed between 0.01-1.5 V at C/20 rate. As shown on the voltage-capacity plots of the three formation cycles (FIG. 12), after initial SEI formation during first cycle, the Si electrode functionalized with EC exhibited the best passivation effect among the three investigated cells as is indicated by the almost identical voltage-capacity plots of the following two formation cycles. A small, unique peak (~1.6V) on the differential capacity profiles of EC-Si cell is observed, which might be caused by the surface EC decomposition. The cell also showed an 8.5% higher initial capacity than the pristine SiNP electrode and improvement in initial Coulombic efficiency (CE) (~ 4%). See FIG. 13. On the other hand, although MC-Si (methylcarbonate, see Scheme 4) cells showed the highest initial capacity, 11.7% higher than pristine SiNP one, the passivation effect of an MC group is not as significant as that of EC as is indicated by a gradual fade on voltage profile and a much lower initial CE (71.7%). See FIG. 13. The difference in passivation effect probably comes from the stability of organic groups during extensive cell operation on the electrode surface. At a C/3 rate, the EC-Si electrode demonstrated the most stable capacity at an average 1925 mAh/g, which is 21% higher than pristine electrode and a capacity retention of 87.1% after 100 cycles. In addition, the Coulombic efficiency of an EC-Si electrode gradually increases and stabilizes at over 99% after 50 cycles, while the Coulombic efficiency of pristine electrode reached 99% after 80 cycles. In comparison, the MC-Si electrode showed a very similar performance with EC-Si electrode during the initial 20 cycles. However, the capacity gradually decayed afterward and only 57.6% capacity remained after 100 cycles. The stabilization effect of surface EC group also reflected on the much lower interfacial impedance revealed by EIS study (not shown).

Figure 14:
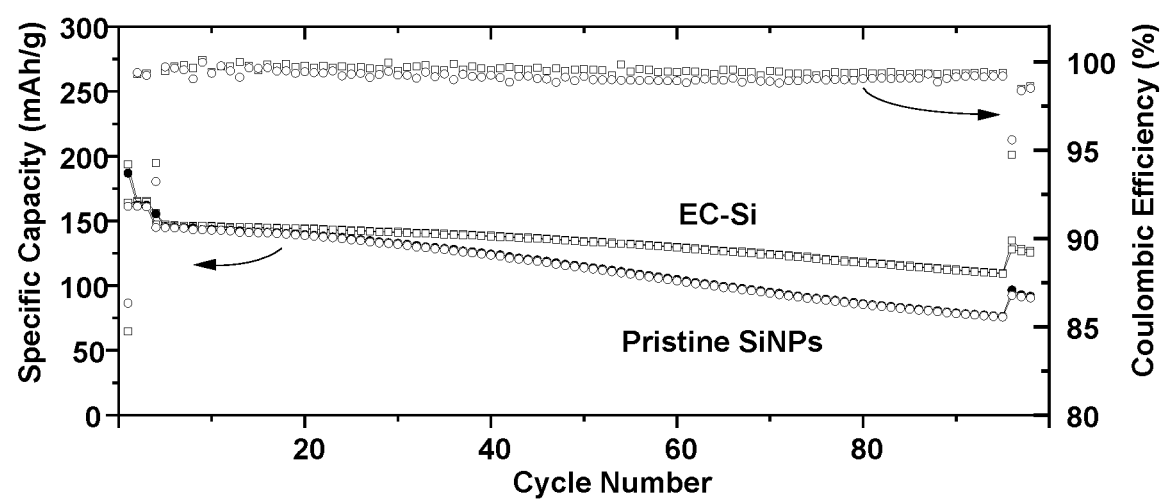
FIG. 14 is a graph of electrochemical performance of Si/NMC622 full cells, according to the examples.

The advantage of AF-SiNPs over pristine SiNPs was also demonstrated in full cells, where an Si anode is matched with a $LiNi_{0.6}Mn_{0.2}Co_{0.2}O_2$ cathode. The cells underwent three formation cycles at C/20 with cutoff voltage of 3.0-4.2 V, followed by 92 C/3 cycles and another three C/30 cycles. As is shown in the full cell performance diagram (FIG. 14), the pattern of electrochemical performance is similar for the EC-Si cell and pristine NP cell during the initial 30 cycles. However, after that the pristine NP cell started to decay and the capacity retention is 58% after 92 C/3 cycles. In comparison, EC-Si cell showed much more stable capacity with a retention of 78% after prolonged cycling.

Figure 15:
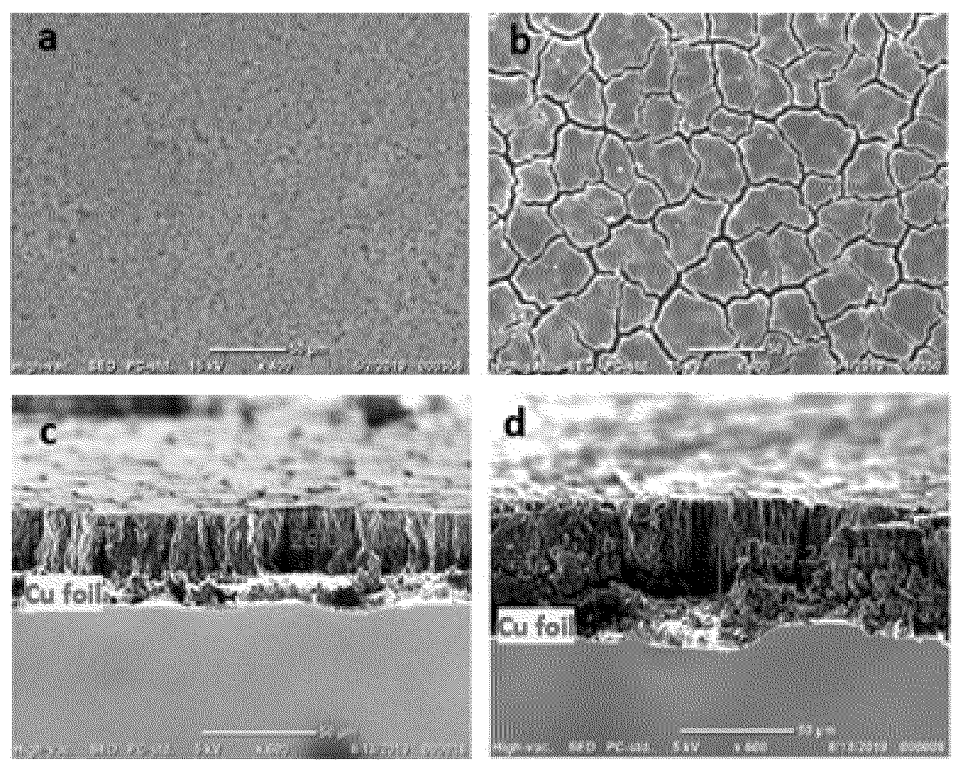
FIG. 15, panels a and b are SEM micrographs of pristine electrode before and after cycle, respectively, and panels c and d are cross-section SEM micrographs of pristine electrode before and after cycle, according to the examples.
Figure 16:
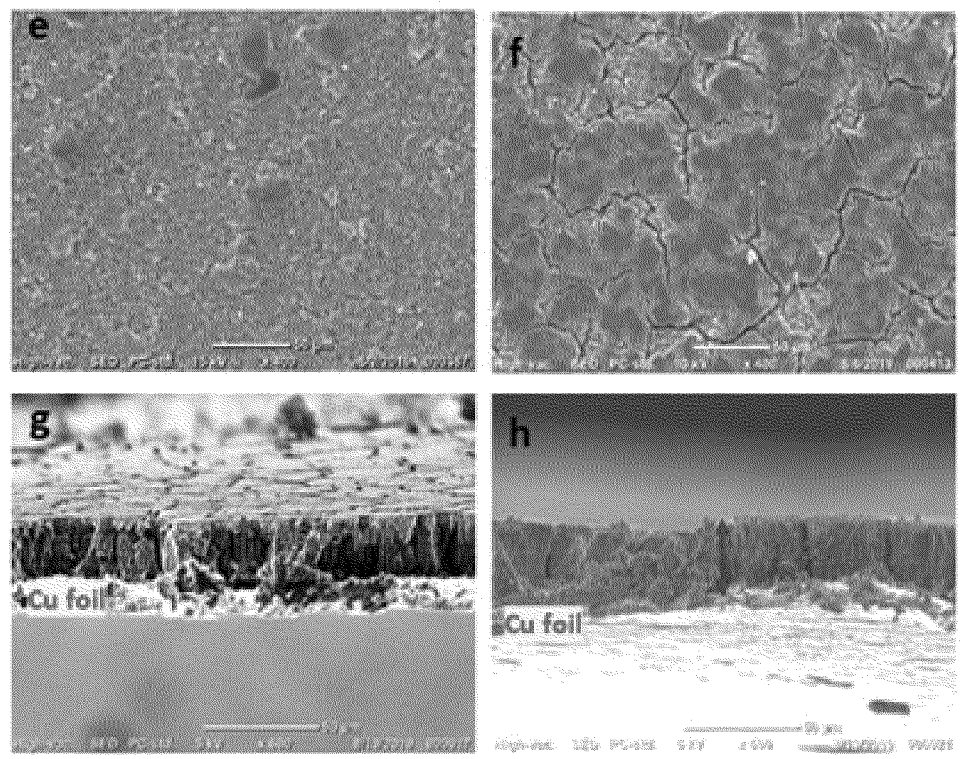
FIG. 16, panels e and f are SEM micrographs of EC-Si electrode before and after cycle, respectively; and panels g and h are cross-section SEM micrographs of EC-Si electrode before and after cycle, respectively.

Post-cycle analysis provides an insightful interpretation of the improvement in electrochemical performance. ASEI effectively stabilizes the electrode/electrolyte interface as determined by SEM analysis (FIGS. 15 and 16) where less surface growth (determined by cross-section SEM analysis of electrodes before and after cycling) were observed for EC-Si electrode. Panels a and b of FIG. 15 are SEM micrographs of the pristine electrode before and after cycle, respectively, while panels c and d are cross-section SEM micrographs of the pristine electrode before and after cycle, respectively. In FIG. 16, panels e and f are SEM micrographs of the EC-Si electrode before and after cycle, respectively, whiles panels g and h are cross-section SEM micrographs of the EC-Si electrode before and after cycle, respectively. As will be observed, the EC-Si cells hold up during cycling much better than the pristine SiNP cells.

Figure 17:
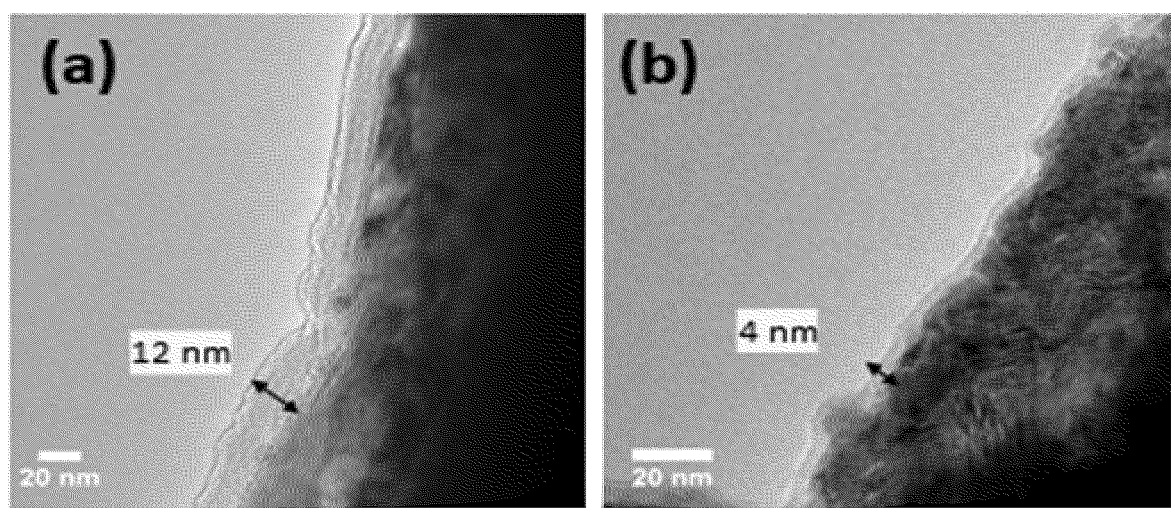
FIG. 17, panels a and b are TEM pictures of the electrode after 100 cycles: pristine SiNPs electrode, EC-Si electrode, respectively, according to the examples.

TEM analysis (FIG. 17) of the cycled electrodes also shows that a thicker SEI layer formed on electrode without surface modification. In terms of electrode morphology, the pristine Si electrode was diminished into small crackers after extended electrochemical cycles. The result could be a dramatic surface area increase that worsen the interface instability. In contrast, surface functionalization helps to retain the shape and size of Si particles.

In addition, EDX results show that the introduction of ASEI also affect electrode surface compositions. The fluorine content on the surface of cycled pristine electrode is almost 2 times that on the surface of cycled EC-Si electrode, indicating that more reactions taken place on the surface of pristine electrode during cell operation. This result is consistent with the XPS analysis of cycled electrodes where the intensity of LiF peak on the surface of pristine electrode is much higher than that of EC-Si electrode. Also observed was that while the same amount of binder and carbon additives were used, the intensities of species including carbonyl and ether groups are much higher on the surface of pristine SiNP electrode than that of AF-Si electrode, another proof of suppressing side reaction by surface functionalization.

With the decrease in particle size of silicon used as anode materials for lithium-ion battery, surface properties of silicon materials play a significant role in electrochemical performance. Using facial chemical surface functionalization method, the SEI formation on silicon anode is tailored by covalently binding an electrolyte solvent analogue cyclic carbonate group onto the surface of SiNPs. This molecule-level surface modification not only provides a delicate control in both surface composition and structure of Si particle, forming a resilient protection layer, but also participating in SEI formation and ensure a strong interaction between SEI and Si, leading to a stable capacity retention as demonstrated in both half-cell and full cell.

Example 8. Scheme 6 illustrates the attached of an epoxy group to the surface of a silicon nanoparticle via a silanization reaction between silanol-enriched SiNPs and functional silanes.

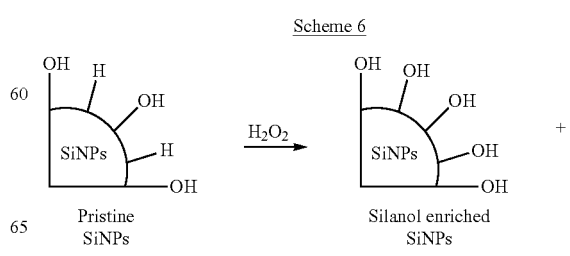

Scheme 6

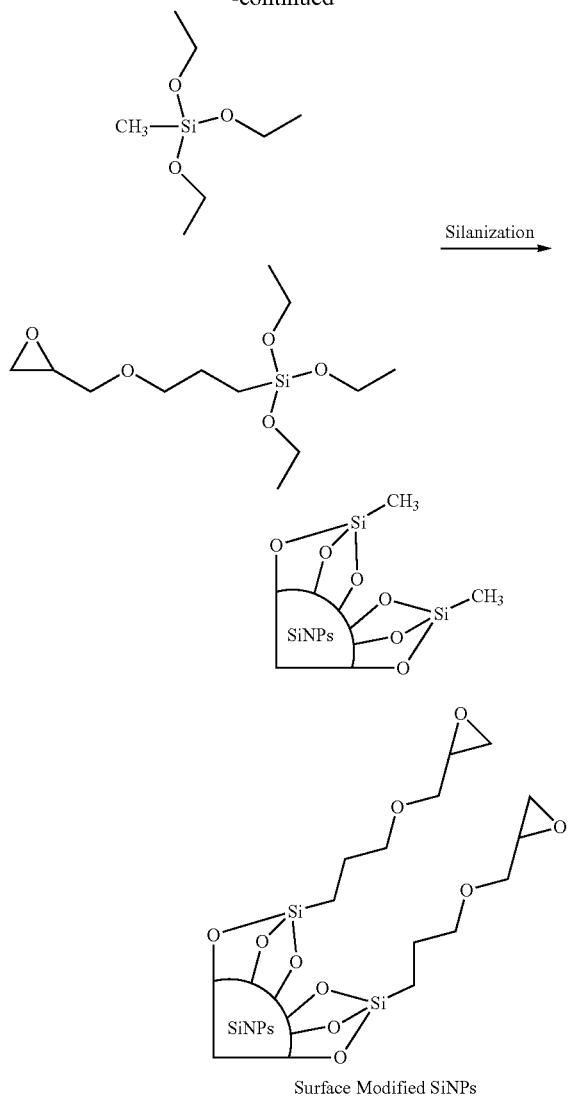

Surface Modified SiNPs

Silicon nanoparticles (0.998 g; average particle size of 80 nm) were charged to a 100 mL round-bottom flask equipped with a magnetic stirring bar and $N_2$ inlet, pristine SiNPs (0.998 g), and absolute ethanol (20 mL) added. The mixture was ultrasonicated for 15 minutes until a homogeneous dispersion was formed. $H_2O_2$ (30 wt % aqueous solution, 40 mL) was added to the flask and the mixture was stirred at 75° C. for 48 hours under $N_2$. The resultant Si—OH SiNPs were isolated by centrifugation (14,000 rpm, 30 min) with a yield of 86.7%.

The Si—OH enriched SiNPs (0.500 g) were then dispersed in dry tetrahydrofuran (10 mL) in a 100 mL flask equipped with a magnetic stirring bar and $N_2$ inlet. After 15 minutes of ultrasonication, glycidylpropyltriethoxysilane (1.000 g) and triethylamine (0.500 g) were added dropwise to the dispersion. The reaction mixture was stirred and refluxed at 75° C. for 48 h under $N_2$. After centrifugation (14,000 rpm, 30 minutes), the particles were further dispersed in dry tetrahydrofuran for a $2^{nd}$ centrifugation. The final products were obtained after vacuum drying at 50° C. overnight (0.437 g, 87.4% yield). By the same method, methyl functionalized SiNPs ($CH_3$-SiNPs) were prepared by reacting Si—OH SiNPs with a methyltriethoxysilane precursor.

Characterization of Functionalized SiNPs. FTIR spectra (not shown) were acquired on a Thermo Scientific Nicolet iS5 spectrometer using an attenuated total reflection model. Thermogravimetric analysis was conducted in an Ar atmosphere with a heating rate of 20° C./min from room temperature to 800° C. using a NETZSCH STA 449 F3 Jupiter for simultaneous thermogravimetry-differential scanning calorimetry (STA/TG-DSC). The morphologies of SiNPs were analyzed by an FEI Tecnai F20ST scanning/transmission electron microscopy (TEM). The TEM specimens were prepared from 1 mg/g SiNPs suspension in acetone solvent by casting the Si particles on the carbon-coated copper TEM grid.

Si Electrode Fabrication and Electrochemical Testing. Surface-functionalized SiNPs (70%), Timcal C45 carbon black (10%), and polyacrylic acid (PAA) binder ($M_n$=175 KDa) (20%) were thoroughly mixed in deionized water and stirred at room temperature. The resulting uniform slurry was then cast onto a copper foil with a 50 μm-gap doctor blade. The dried and calendared electrode was punched into 1.6 cm$^2$ circular disks with a loading of 1.0 mg/cm$^2$. 2032 coin cells were then assembled with the SiNPS anode and cycled using a Maccor cycler with a C/3 rate and a cutoff voltage of 1.5-0.01 V after three C/20 formation cycles. Electrochemical impedance spectroscopy (EIS) was performed with a Solartron Analytical 1400 Cell Test System in the frequency range of 1 MHz to 0.1 Hz.

Adhesion testing. An adhesion test of the Si/PAA electrode was performed on an Instron 3343 universal test machine. The preparation of the laminate is the same as described above. However, the electrodes were cut into squares with fixed dimension (50 mm×20 mm). The current collector side of the electrode was fixed by a clamp while the active coating side of the electrode was taped with Scotch magic tape (3M). The electrode was gradually peeled by pulling the tape at an angle of 180° with a constant rate of 10 mm/s. The applied force was measured, recorded, and plotted.

Post-Test Analysis. The cycled coin cells were disassembled in the argon-filled glovebox, and the electrodes were rinsed with anhydrous dimethyl carbonate and dried in a vacuum oven. The morphologies and the elemental mapping of the cycled electrodes were examined with SEM (Hitachi 5-4700-II) and EDX (the Bruker XFlash® 6|60), respectively. Surface analysis of the SiNPs was performed by XPS (PHI 5000 VersaProbe II System from Physical Electronics) with a base pressure of ~2×10$^{-9}$ Torr. The spectra were obtained with an Al Kα radiation (hv=1486.6 eV) beam (100 μm, 25 W) and electron beam sample neutralization, in fixed analyzer transmission mode. Peak fitting was performed using Shirley background correction and the Gaussian-Lorentzian curve synthesis available in CasaXPS software.

Figure 18:
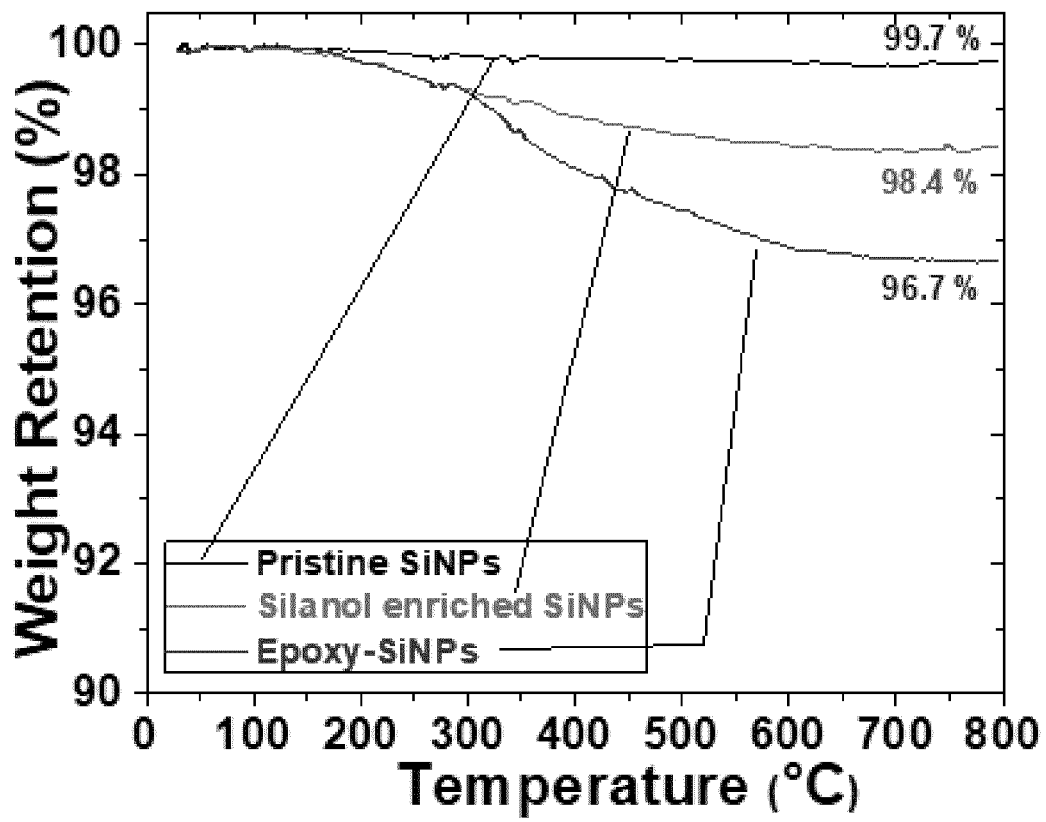
FIG. 18 a TGA profile for pristine SiNPs, silanol SiNPs, and epoxy-SiNPs, according to the examples.

Results and Discussion. Scheme 6 outlines the synthetic route for the surface-functionalized silicon nanoparticles. Commercial SiNPs were first treated by hydrogen peroxide solution to convert Si—H and Si—O—Si groups to silanol (—Si—OH) group following a literature procedure. The Si—OH SiNPs are subject to surface hydrolysis/condensation reaction with glycidylpropyltriethoxysilane. The pristine SiNPs exhibited a broad peak at 1100 cm$^{-1}$ (expands from 1000 cm$^{-1}$ to 1250 cm$^{-1}$) in the FTIR spectrum, which is a typical stretching vibration peak for the Si—O—Si bond and indicates the existence of a native $SiO_x$ layer on the pristine SiNPs. After the hydrogen peroxide treatment, there was an observed increase in Si—OH peak intensity (~3300 cm$^{-1}$ and ~1644 cm$^{-1}$), thereby indicating that more silanol groups were generated on the surface of the pristine SiNPs. During the synthesis of epoxy-terminated SiNPs, a hydrolysis and condensation reaction formed a new Si—O—Si bond on the surface of the particle. Again, FTIR (not shown) was used to analyze the epoxy SiNPs, and exhibiting a band at 1250-1500 cm$^{-1}$, which was attributed to the ring expansion of the epoxy ring. The TGA data (FIG. 18) further confirmed the successful attachment of the epoxy group, with negligible weight loss (0.3%) being observed for the pristine SiNPs. However, this value increased to 3.2% for the epoxy-SiNPs. The TEM images (not shown) provided additional evidence of the synthesized SiNPs. Methyl-terminated SiNPs (CH$_3$-SiNPs) were also synthesized by reacting Si—OH SiNPs with methyl triethoxysilane, and characterized.

Figure 19:
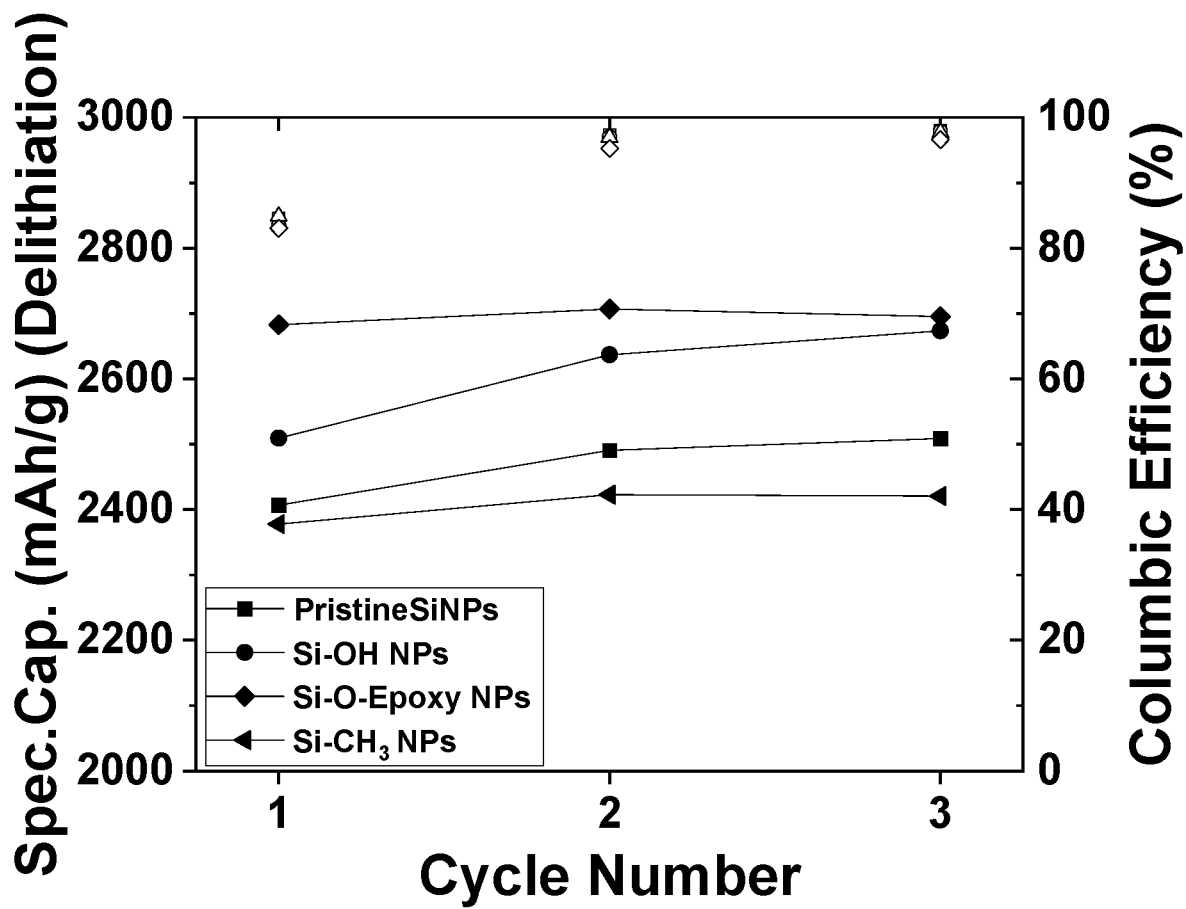
FIG. 19 is a graph of specific capacity and Coulombic efficiency of Si/Li cells after 3 C/3 cycles, according to the examples.
Figure 20:
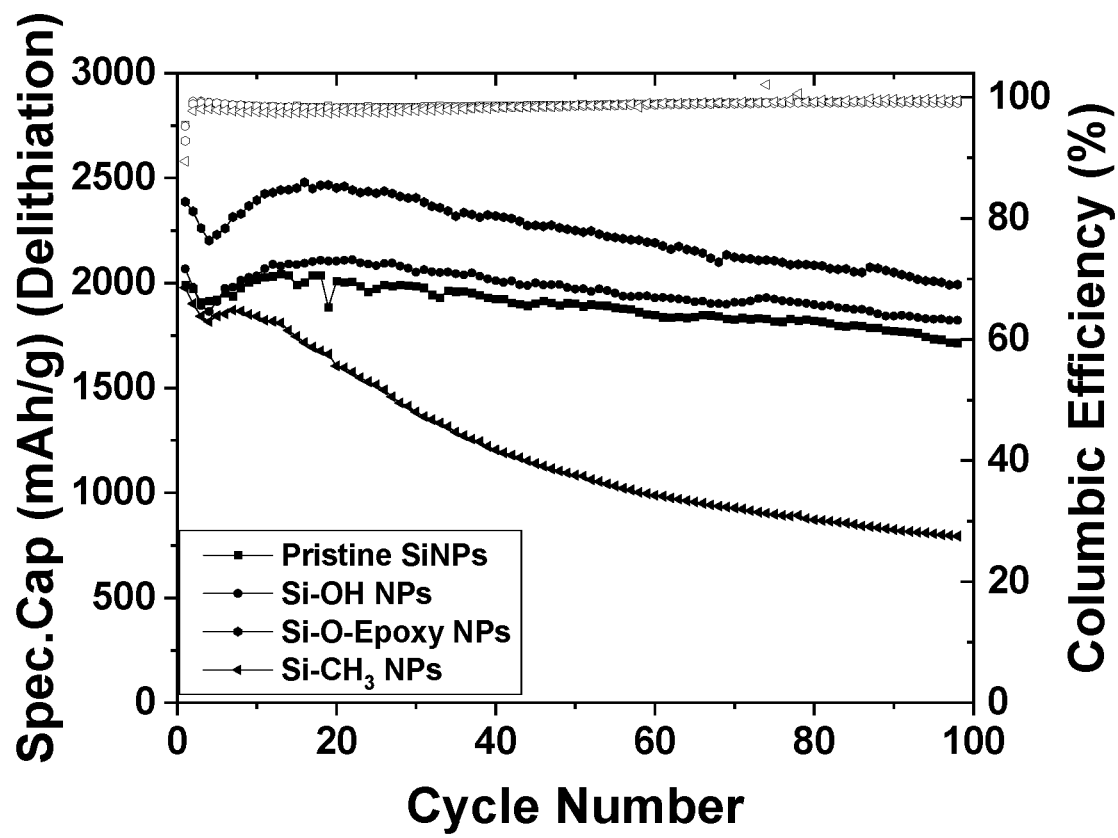
FIG. 20 is a graph of specific capacity and Coulombic efficiency of Si/Li cells after 100 C/3 cycles, according to the examples.

Electrochemical performance. To determine the electrochemical performance, three different Si electrodes all prepared with 70 wt % silicon, 20 wt % PAA, and 10 wt % carbon black, were coated with pristine SiNPs, CH$_3$-SiNPs, and epoxy-SiNPs, respectively, as active anode materials. After three C/20 formation cycles, the various Si/Li cells were operated for 100 cycles at a C/3 rate. Cell capacity and Coulombic efficiency for three formation cycles at C/20 rate are shown in FIG. 19, and the cycling performance for one 100 cycles at the C/3 rate is shown in FIG. 20. The pristine SiNPs electrode shows an initial delithiation capacity of 1989 mAh/g and an average capacity 1890 mAh/g for 100 cycles. Both values for the epoxy-SiNPs electrode are much higher (initial capacity of 2294 mAh/g and average capacity of 2169 mAh/g) than those for the pristine anode. Surprisingly, the CH$_3$-SiNPs electrode exhibited rapid fade in capacity with increasing cycle number (initial capacity of 1976 mAh/g and average capacity of 1212 mAh/g) (FIG. 20). These data clearly indicate that the functional group on the surface of the SiNPs has a significant impact on the electrochemical performance of the Si electrode.

Figure 21:
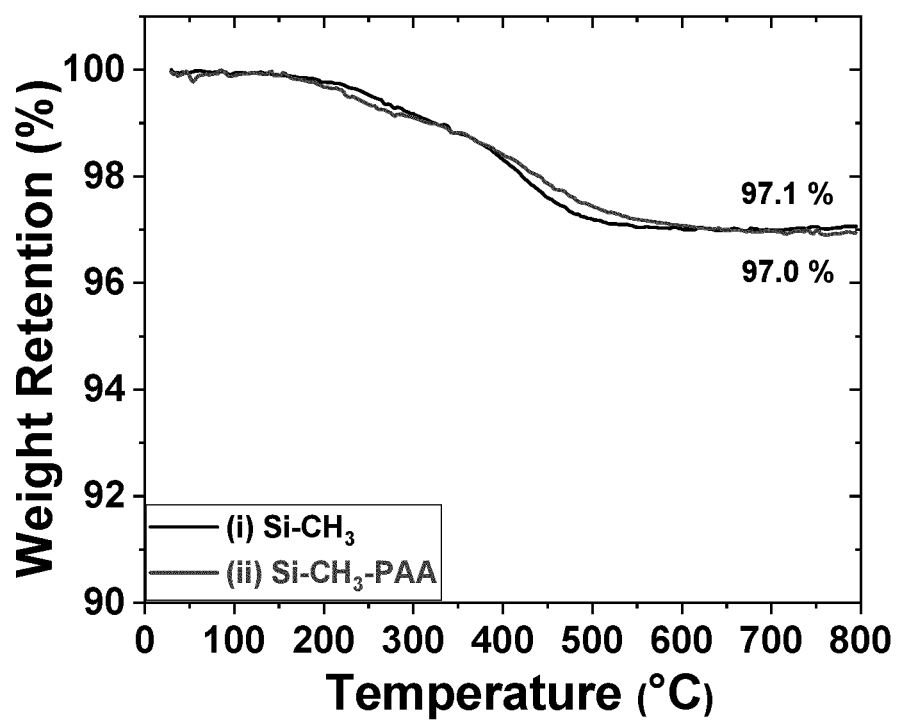
FIG. 21 is a TGA profile of $CH_3$-SiNPs and $CH_3$-SiNPs treated with PAA, according to the examples.
Figure 22:
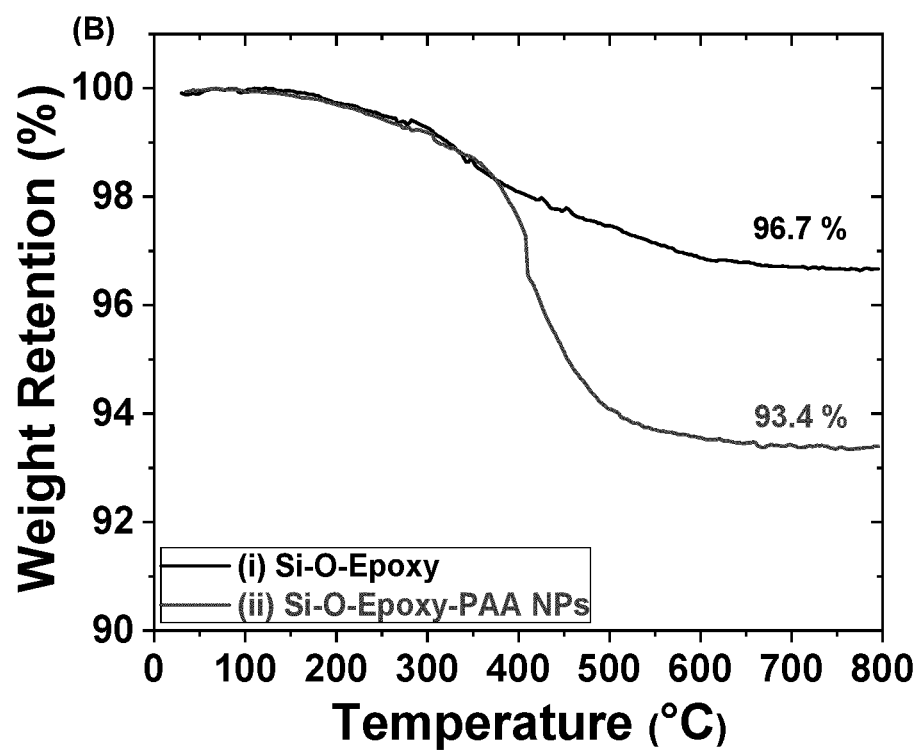
FIG. 22 is a TGA profile of epoxy-SiNPs and epoxy-SiNPs treated with PAA, according to the examples.

The chemical reaction between the epoxy-SiNPs and PAA binder was examined by mixing the epoxy-SiNPs and CH$_3$-SiNPs with a PAA binder using the same composition used in the anode slurry and stirring at room temperature for overnight, similar to the reaction of Example 5. The reacted SiNPs were isolated by high-speed centrifugation and subjected to TGA analysis as well as FT-IR analysis. For the CH$_3$—SiNP particles, the TGA profiles are almost identical before and after the reaction with PAA binder (FIG. 21), but an additional weight loss was observed for the PAA treated epoxy-SiNPs as shown in FIG. 22. This indicates that PAA segments were attached to the surface of the epoxy-SiNPs particles via the ring-opening addition reaction of the epoxy group with the hydroxyl group from the PAA binder. FTIR peaks corresponding to the stretching vibration of carbonyl (1725 cm$^{-1}$) and carboxylate (1450 cm$^{-1}$ and 1420 cm$^{-1}$) were observed in the FTIR spectrum (not shown) for the binder treated epoxy-SiNPs, not for the CH$_3$-SiNPs, which is a strong evidence for the chemical reaction between epoxy group and the hydroxyl group from the PAA binder.

Figures 23A, 23B, 23C, 23D, 23E, 23F:
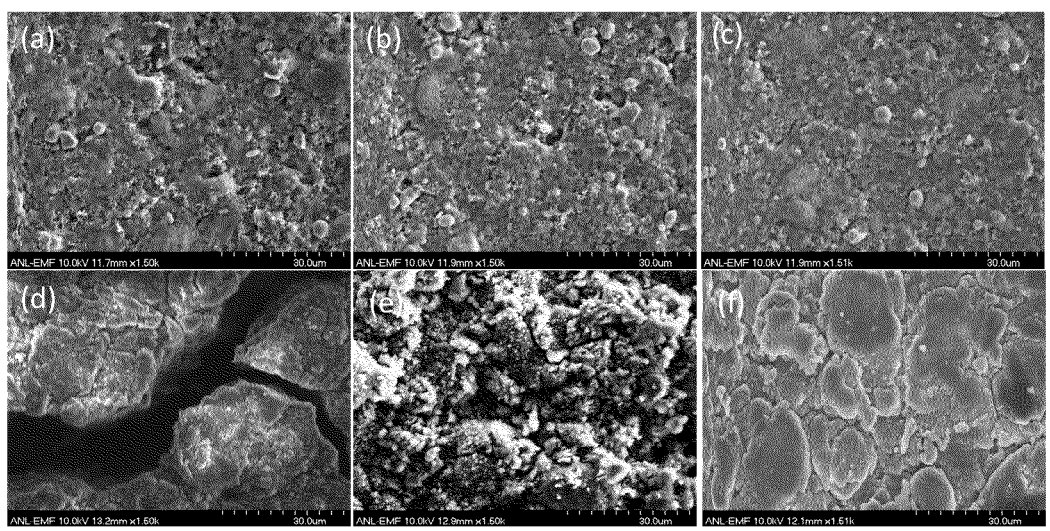
FIGS. 23A-23F (marked as (a), (b), (c), (d), (e), and (f) in the figures) are SEM images of the freshly prepared Si/PAA electrodes with (a) pristine SiNPs, (b) Si—OH SiNPs, and (c) epoxy-SiNPs and cycled Si/PAA electrodes with (d) pristine SiNPs, (e) Si—OH SiNPs, and (f) epoxy-SiNPs as active materials, according to the examples.

The formation of the covalent bond of epoxy-SiNPs and PAA binder benefits the electrode integrity especially during extended cycling. FIGS. 23A, 23B, and 23C are SEM images of the freshly made electrode with pristine SiNPs, Si—OH SiNPs, and epoxy-SiNPs as active materials. The electrode morphology is similar, and active material, carbon black and binder were distributed uniformly. The molar ratio of Si, C and O was close to the feeding ratio of the slurry as determined by the EDX element mapping (not shown). However, after 100 cycles, large cracks appeared in the cycled pristine SiNPs (FIG. 23D). In contrast, no such cracking was observed in the Si—OH and epoxy-SiNPs anodes (FIGS. 23E and 23F), suggesting the functional groups help preserve the electrode integrity even at the deep cycling stage.

The binding strength is important to the electrochemical performance of the Si-based electrode since strong bonding between the active particles and the particle/current collector help maintain the electrical contacts and the integrity of the Si anode. A peel test was employed to evaluate the adhesive strength of the Si/PAA anode. A continuous force was applied to the surface of the electrode and when the Si/PAA anode was peeled off of the current collector (copper foil in this case), the resulting load/width (N/cm) reflects the adhesive strength of the whole electrode. The epoxy-SiNPs showed the strongest adhesion among the tested electrodes, and this is attributed to the high reactivity and strong interaction of the epoxy group with hydroxyl groups from the PAA binder and the Cu current collector.

Para. 1. A composition comprising a silicon nanoparticle having surface-attached groups, and the silicon nanoparticle is represented by the formula:

[Si]-[linker]-[terminal group]

wherein:
[Si] represents the surface of the silicon nanoparticle;
[terminal group] is a moiety that is configured for further reaction or is compatible with the electrolyte; and
[linker] is a group linking the surface of the silicon nanoparticle to the [terminal group].

Para. 2. The composition of Para. 1, wherein [linker] comprises an alkylenyl group; an alkylenyl group interrupted by oxygen atoms; or a group of formula —OSiR$^a$R$^b$R$^c$, wherein R$^a$ and R$^b$ are individually an oxygen atom that is also connected to the surface of the silicon nanoparticle, an —O-siloxy group, or an alkyl connected to a functional group; and R$^c$ is an alkylenyl group or an alkylenyl group interrupted by oxygen atoms, and R$^c$ is connected to [terminal group].

Para. 3. The composition of Paras. 1 or 2, wherein [terminal group] is F, Cl, Br, I, CN, —P(O)(OR$^{10}$)$_2$, substituted or unsubstituted alkyl, substituted or unsubstituted cycloalkyl, substituted or unsubstituted heterocyclyl, substituted or unsubstituted silyl, or substituted or unsubstituted siloxyl; and each R$^{10}$ is individually a substituted or unsubstituted alkyl.

Para. 4. The composition of any one of Paras. 1-3, wherein [linker] is —(CH$_2$)$_x$— and x is from 1 to 10.

Para. 5. The composition of any one of Paras. 1-3, wherein [linker] is —((CH$_2$)$_x$O)$_{x'}$—, x is from 1 to 10, and x' is 1, 2, or 3, and the orientation of the group is preserved.

Para. 6. The composition of Para. 6. The composition of Paras. 2, wherein the silicon nanoparticle is represented by the formula:

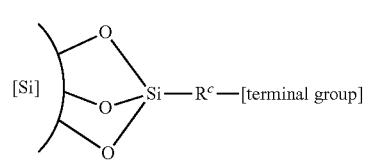

wherein R$^c$ is an alkylenyl group or an alkylenyl group interrupted by oxygen atoms.

Para. 7. The composition of Para. 6, wherein R$^c$ is —(CH$_2$)$_x$— or —((CH$_2$)$_x$O)$_{x'}$—, and x is from 1 to 10, and x' is 1, 2, or 3, and the orientation of the group is preserved.

Para. 8. The composition of Para. 2, wherein [linker] is a group of formula —OSiR$^a$R$^b$R$^c$, wherein R$^a$ and R$^b$ are individually an alkyl connected to a functional group; and R$^c$ is an alkylenyl group or an alkylenyl group interrupted by oxygen atoms.

Para. 9. The composition of any one of Paras. 1-8, wherein [terminal group] is an alkyl, a fluorinated alkyl, a carbonate, a fluorinated carbonate, a vinylene carbonate, a fluorinated vinylene carbonate, a sultone, a fluorinated sultone, a phosphonate, a fluorinated phosphonate, an oxalate, a fluorinated oxalate, an ester, a fluorinated ester, an anhydride, or a fluorinated anhydride.

Para. 10. The composition of Para. 1, wherein the silicon nanoparticle comprising surface attached groups is represented as:

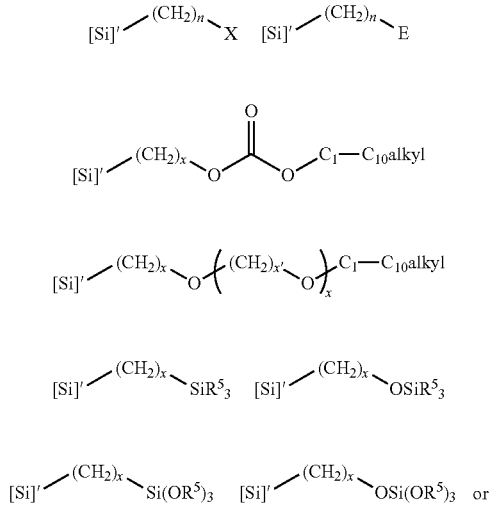

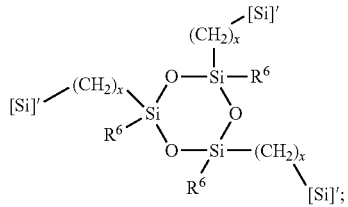

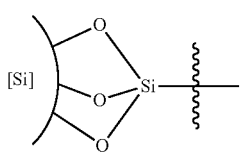

wherein:

[Si]' represents [Si] or a group of formula:

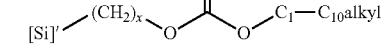

E is epoxy or ethylene carbonate;
X is CN, F, Cl, Br, or I;
each x is individually 1 to 10;
each R$^5$ is individually alkyl or -Oalkyl; and
each R$^6$ is individually alkyl.

Para. 11. The composition of Paras. 1, wherein the silicon nanoparticle is represented as:

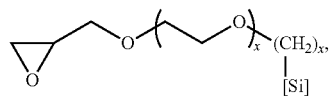

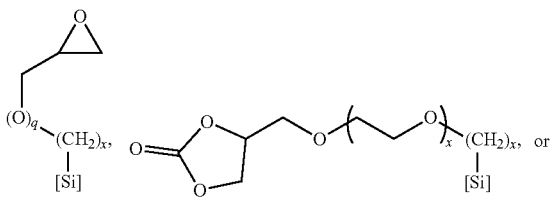

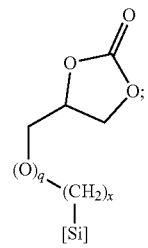

wherein: each x is individually 1-10 and q is 0 or 1.

Para. 12. A polymeric composite for an electrochemical cell, the polymeric composite comprising a silicon nanoparticle covalently attached to an acid-functional polymer.

Para. 13. The polymer composite of Para. 12 that is the reaction product of an epoxy-functional silicon nanoparticle and the porous, acid-functional polymer.

Para. 14. The polymer composite of Paras. 12 represented as:

Polymer-R$^9$—SiNP;

wherein:
Polymer is a porous, acid-functional polymeric binder;
SiNP is the silicon nanoparticle; and
R$^9$ is a linker group comprising an ester linkage.

Para. 15. The polymer composite of any one of Paras. 12-14 represented as:

Polymer-C(O)OCH$_2$C(OH)CH$_2$(OCH$_2$CH$_2$)$_n$O(CH$_2$)$_{n'}$—SiNP or

Polymer-C(O)OCH$_2$C(OH)CH$_2$(OCH$_2$CH$_2$)$_n$O(CH$_2$)$_n$Si(O)$_3$SiNP wherein: n is from 1 to 10, and n' is 0-10.

Para. 16. The polymer composite of any one of Paras. 12-15 represented as:

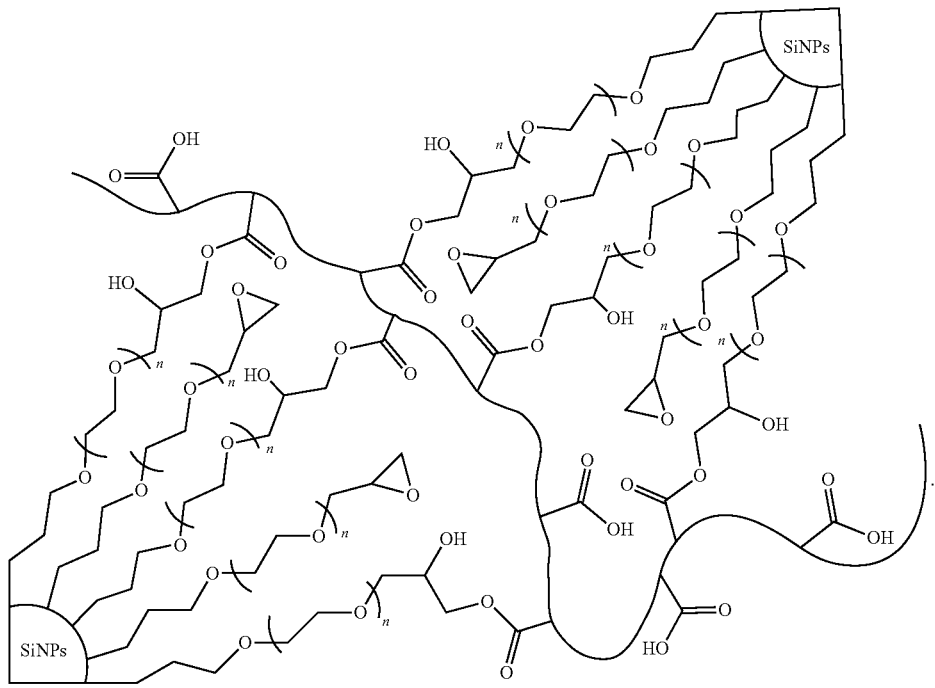

Para. 17. An anode for a secondary lithium or sodium ion battery, the anode comprising the composition of any one of Paras. 1-11 and/or the polymer composite of any one of Paras. 12-16, and a current collector.

Para. 18. A secondary electrochemical cell comprising a cathode, an electrolyte, and the anode of Para. 17.

Para. 19. A process for forming a functionalized silicon nanoparticle, the process comprising: contacting a silicon nanoparticle (SiNP) with an aqueous solution of HF to form a treated SiNP; contacting the treated SiNP with an olefin in the presence of a hydrosilylation catalyst to form the functionalized silicon nanoparticle.

Para. 20. The process of Para. 19, wherein the olefin is a compound of formula:

$$H_2C=CHR^1,$$

wherein:
$R^1$ is a substituted or unsubstituted alkyl, silyl, or siloxyl group.

Para. 21. A composition comprises a silicon nanoparticle comprising surfaced attached groups of formula —$R^1$—$R^2$—$R^3$;
wherein:
$R^1$ is an alkylenyl;
$R^2$ is absent or is a group of formula —(O-alkyl)$_n$-;
n is from 1 to 10;
$R^3$ is F, Cl, Br, I, CN, —P(O)(OR$^{10}$)$_2$, substituted or unsubstituted alkyl, substituted or unsubstituted cycloalkyl, substituted or unsubstituted heterocyclyl, substituted or unsubstituted silyl, or substituted or unsubstituted siloxyl; and
each $R^{10}$ is individually a substituted or unsubstituted alkyl.

Para. 22. The composition of Para. 21, wherein $R^1$ is —(CH$_2$)$_x$—; and x is from 1 to 10.

Para. 23. The composition of Para. 21 or 22, wherein $R^2$ is a group of formula —(O-alkyl)$_n$-, and alkyl is a $C_1$-$C_{10}$ alkyl.

Para. 24. The composition of any one of Paras. 21-23, wherein $R^2$ is —(O—CH$_2$)$_n$—, —(O—CH$_2$CH$_2$)$_n$—, or —(O—CH$_2$CH$_2$CH$_2$)$_n$—; and n is 1, 2, 3, or 4.

Para. 25. The composition of Para. 1, wherein $R^2$ is absent.

Para. 26. The composition of any one of Paras. 21-25, wherein $R^3$ is alkyl, fluorinated alkyl, carbonate, fluorinated carbonate, vinylene carbonate, fluorinated vinylene carbonate, sultone, fluorinated sultone, phosphonate, fluorinated phosphonate, oxalate, fluorinated oxalate, ester, fluorinated ester, anhydride, or fluorinated anhydride.

Para. 27. The composition of any one of Paras. 21-26, wherein $R^3$ is F, Cl, Br, I, CN, methyl, ethyl, propyl, iso-propyl, n-butyl, sec-butyl, t-butyl, epoxy, a cyclic carbonate, an alkylcarbonate, pyridyl, piperidinyl, morpholino, siloxyl, or silyl.

Para. 28. A composition comprises a silicon nanoparticle comprising the reaction product of a hydroxy functional surface on the silicon nanoparticle and a siloxane.

Para. 29. The composition of Para. 28, wherein the siloxane is an epoxy functionalized siloxane.

Para. 30. The composition of Para. 28 and 29, wherein the siloxane is a compound of general formula Si(OR$^{20}$)$_3$R$^{21}$, wherein each $R^{20}$ is independently alkyl, and $R^{21}$ is an alkyl, an epoxyalkyl, or an epoxyalkyl$^a$ where the alkyl$^a$ is interrupted by ether and/or ester groups.

Para. 31. The composition of Para. 29, wherein $R^{20}$ is methyl, ethyl, n-propyl, isopropyl, n-butyl, sec-butyl, or tert-butyl.

Para. 32. The composition of Para. 29, wherein $R^{21}$ is alkyl.

Para. 33. The composition of Para. 29, wherein $R^{21}$ is $C_1$-$C_{20}$ alkyl.

Para. 34. The composition of Para. 29, wherein $R^{21}$ is represented as

wherein t and t' are independently 1, 2, 3, 4, 5, or 6.

Para. 35. An anode for a secondary lithium or sodium ion battery, the anode comprising the composition of any one of Paras. 28-34 and a current collector.

Para. 36. The anode of Para. 35, wherein the current collector comprises copper metal.

Para. 37. The anode of Para. 35 and 36 further comprising bulk silicon and optionally a binder material and/or conductive additives.

Para. 38. A secondary electrochemical cell comprising a cathode, an electrolyte, and the anode of any of Paras. 35-37.

Para. 39. A process for forming a functionalized silicon nanoparticle, the process comprising: contacting a silicon nanoparticle (SiNP) with an aqueous solution of $H_2O_2$ to form silanol SiNP; contacting the silanol SiNP with an epoxy functionalized siloxane, under basic or acidic reaction conditions.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising a silicon nanoparticle having surface-attached groups, and the silicon nanoparticle is represented by the formula:

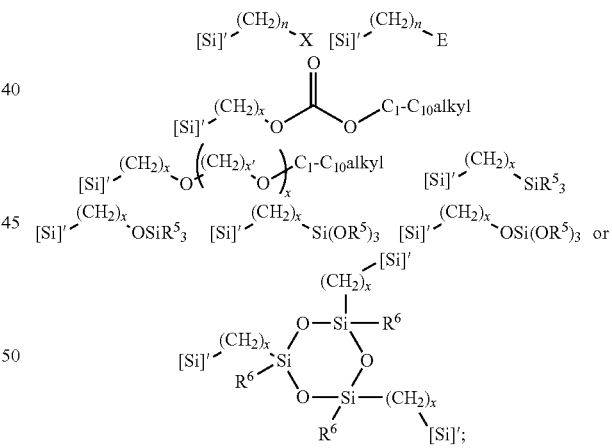

wherein:
[Si]' represents [Si] or a group of formula:

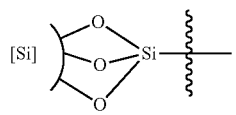

[Si] represents the surface of the silicon nanoparticle;
E is epoxy or ethylene carbonate;
X is CN, F, Cl, Br, or I;

each x is individually 1 to 10;
each $R^5$ is individually alkyl or —Oalkyl; and
each $R^6$ is individually alkyl.

2. The composition of claim 1, wherein the silicon nanoparticle is represented as:

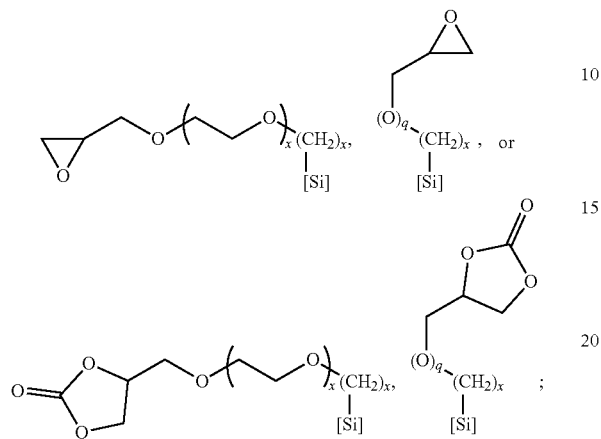

wherein: each x is individually 1-10 and q is 0 or 1.

3. An anode for a secondary lithium or sodium ion battery, the anode comprising the composition of claim 1 and a current collector.

4. A secondary electrochemical cell comprising a cathode, an electrolyte, and the anode of claim 3.

* * * * *